US006256897B1

(12) United States Patent
Mikame

(10) Patent No.: US 6,256,897 B1
(45) Date of Patent: Jul. 10, 2001

(54) THREE DIMENSIONAL CAM, METHOD AND APPARATUS FOR MEASURING THREE DIMENSIONAL CAM PROFILE, AND VALVE DRIVE APPARATUS

(75) Inventor: Kazuhisa Mikame, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/502,014

(22) Filed: Feb. 11, 2000

Related U.S. Application Data

(62) Division of application No. 09/054,551, filed on Apr. 3, 1998, now abandoned.

(30) Foreign Application Priority Data

Apr. 4, 1997 (JP) .................................................. 9-086712
Jan. 21, 1998 (JP) .................................................. 10-009564

(51) Int. Cl.[7] .................................................. G01B 1/00
(52) U.S. Cl. .................................................. 33/519; 33/501.02
(58) Field of Search .................................. 33/710–712, 805, 33/832, 833, 519, 600, 603, 549, 551–555, 545, 546, 501.02, 501.03, 806, 784

(56) References Cited

U.S. PATENT DOCUMENTS

| | | | | |
|---|---|---|---|---|
| 2,735,313 | | 2/1956 | Dickson . | |
| 2,914,938 | * | 12/1959 | Laakso | 33/546 |
| 3,328,885 | * | 7/1967 | Frindel | 33/551 |
| 3,596,362 | * | 8/1971 | Reason | 33/556 |
| 3,899,564 | | 8/1975 | Bencini et al. . | |
| 4,164,694 | * | 8/1979 | Amsbury et al. | 33/551 |
| 4,622,756 | | 11/1986 | Marsden . | |
| 4,625,413 | * | 12/1986 | Possati et al. | 33/551 |
| 4,693,214 | | 9/1987 | Titolo . | |
| 4,850,311 | | 7/1989 | Sohn . | |
| 4,897,925 | * | 2/1990 | Johns | 33/551 |
| 5,001,841 | * | 3/1991 | Takigawa et al. | 33/551 |
| 5,351,411 | * | 10/1994 | Gronskov | 33/551 |
| 5,508,944 | * | 4/1996 | Danielli | 33/519 |

FOREIGN PATENT DOCUMENTS

| | | | | |
|---|---|---|---|---|
| 2355794 | | 5/1975 | (DE) . | |
| 2 514727 | | 10/1975 | (DE) . | |
| 3 817081 | | 2/1989 | (DE) . | |
| 2 360752 | | 3/1978 | (FR) . | |
| 2 550273 | | 2/1985 | (FR) . | |
| 28498 | * | 8/1971 | (JP) | 33/546 |
| 55-87834 | | 7/1980 | (JP) . | |
| 55-96310 | | 7/1980 | (JP) . | |
| 9-32519 | | 2/1991 | (JP) . | |
| 3-179116 | | 8/1991 | (JP) . | |
| 7-45803 | | 4/1995 | (JP) . | |
| 934196 | * | 8/1971 | (SU) | 33/546 |

OTHER PUBLICATIONS

Patent Abstracts of Japan, vol. 006, No. 056 (M–121), Apr. 13, 1982 & JP 56 167804A (Sato Yukio), Dec. 23, 1981.

* cited by examiner

*Primary Examiner*—G. Bradley Bennett
(74) *Attorney, Agent, or Firm*—Kenyon & Kenyon

(57) ABSTRACT

An engine valve drive apparatus. A camshaft rotatably supported by the engine includes a cam for selectively opening and closing a valve. The cam has a cam surface for driving the valve. The cam surface has a profile that varies continuously in the direction of the cam axis. A valve lifter is arranged between the cam and the valve to convey the motion of the cam to the valve. A cam follower is supported on the valve lifter. The cam follower includes a slide surface having a pair of edges. The cam surface is arched outwardly in the direction of the cam axis to prevent the slide surface edges from contacting the cam surface. The curved surface prevents damage to the cam surface and enables smooth sliding between the cam surface and the cam follower. Alternatively, the slide surface of the cam follower may be arched outwardly.

9 Claims, 22 Drawing Sheets

THREE DIMENSIONAL CAM, METHOD AND APPARATUS FOR MEASURING THREE DIMENSIONAL CAM PROFILE, AND VALVE DRIVE APPARATUS

This is a divisional of application Ser. No. 09/054,551, filed Apr. 3, 1998 now abandoned.

BACKGROUND OF THE INVENTION

The present invention relates to a three-dimensional cam having a surface that varies continuously in the axial direction. More particularly, the present invention relates to a three-dimensional engine valve cam having a profile for controlling the opening and closing of engine valves in accordance with the operating state of the engine. The present invention also pertains to a method for measuring three-dimensional cams, measuring tools for testing profiles of three-dimensional cams, and an apparatus for measuring three-dimensional cams. The present invention also relates to an engine valve drive apparatus employing such three-dimensional cams.

FIG. 24 shows a prior art valve drive apparatus that continuously varies the opening and closing timing and lift amount of engine intake valves and engine exhaust valves. Japanese Examined Patent Publication No. 7-45803 and Japanese Unexamined Patent Publication No. 9-32519 describes such apparatus. As shown in FIG. 24, two valves 543, which are either intake valves or exhaust valves, are provided for a single cylinder of an engine. Each valve 543 is connected to and driven by a three-dimensional cam 540, which is fixed to a camshaft 542. The cam 540 has a cam surface 540*a* used to drive the valves 543. A cam nose, the radius of which changes continuously in the direction of the camshaft axis Y of the camshaft 542, is defined on the cam surface 540*a*. The shifting mechanism 541 shifts the camshaft 542 to displace each cam 540 within a range denoted by D. As the cam 540 shifts, the nose radius of the cam surface 540*a* changes continuously. This varies the lift amount and opening and closing timing of the associated valve 543. The change in the lift amount (lift control amount) occurs within a range defined between the maximum and minimum values of the cam nose radius. The shifting of the camshaft 542 along the axis Y is controlled so that the maximum lift amount of each valve 543 is small when the engine is in a low speed range and is large when the engine is in a high speed range. This improves engine performance, especially in terms of torque and stability.

As shown in FIG. 24, a valve lifter 549 is arranged between each valve 543 and the associated three-dimensional cam 540. A cam follower seat 544 is defined in the top center surface of each valve lifter 549. A cam follower 545 is pivotally received in each follower seat 544 so that the valve lifter 549 can follow the cam surface 540*a* of the associated cam 540.

Each cam follower 545 has a flat slide surface 545*a*, which slides along the associated cam surface 540. The shape of the cam follower 545 is shown enlarged in FIGS. 25(*a*) and 25(*b*). As shown in FIG. 25(*a*), the cam follower 545 has a semicircular cross-section. FIG. 25(*b*) is a side view of the cam follower 545.

As shown in FIG. 26, the cam follower 545 has a first edge 545*b* and a second edge 545*c* that engage the cam surface 540*a*. Contact between the cam follower 545 and the cam surface 540*a* occurs between the first edge 545*b* and the second edge 545*c*. The first edge 545*b* contacts the cam surface 540*a* where the cam nose radius is smaller than that where the second edge 545*c* contacts the cam surface 540*a*.

FIG. 27 is a perspective view showing the cam surface 540*a*. The uniformly dashed line represents one axial end of the cam 540, or cam profile 547, where the cam nose radius is smallest. The long and short dashed line represents the other axial end of the cam 540, or cam profile 548, where the cam nose radius is greatest. As apparent from the drawing, the profile of the cam 540 varies continuously in the axial direction. Each elemental line 546 shown in the drawing represents the same angular position on the cam surface 540*a*. In other words, the lines 546 represent intersections between the cam surface and planes that include the axis Y. Although the drawing shows a limited number of lines 546, an infinite number of lines 546 may be defined along the cam surface 540. Hence, the cam follower 545 comes into linear contact with the cam surface 540*a* along part of each line 540.

As shown in FIG. 26, when the three-dimensional cam 540 shifts along the axis Y, the slide surface 545*a* between the first and second edges 545*a*, 545*b* of the cam follower 545 is in linear contact with and moves relative to the cam surface 540*a*. Lubricating oil is removed from the cam surface 540*a* when relative movement takes place between the cam follower 545 and the cam surface 540*a*. This occurs especially when the second edge 545*c* scrapes off the lubricating oil from the cam surface 540*a* as the cam follower 545 shifts along the cam surface 540*a* from the smaller radius side to the larger radius side. As a result, lubrication between the second edge 545*c* and the cam surface 540*a* becomes insufficient. This may lead to wear of the second edge 545*c* and the cam surface 540*a*.

Generally, the small radius side of the cam 540 is used more frequently than the large radius side. Therefore, a difference in wear occurs along the cam surface 540*a* in the axial direction Y. The wear difference causes the cam surface 540*a* to become uneven. An uneven cam surface 540*a* may interfere with the movement of the second edge 545*c* and thus hinder with smooth shifting of the opening and closing timing and lift amount of the associated valve 543.

Additionally, the cam surface 540 is machined with precision so that the surface 540*a* is straight as shown in FIG. 27. However, tolerances permitted during machining of the cam surface 546 may result in a slight concavity in surface 540*a*, as shown in FIG. 28. In such case, only the first and second edges 545*b*, 545*c* of the cam follower 545 contact the cam surface 540*a*. This may cause the first and second edges 545*b*, 545*c* to scratch the cam surface 540*a* during rotation of the cam 545 or cause biased wear of the cam follower 545 at the edges 545*b*, 545*c*.

When scratches are formed in the cam surface 540*a*, the scratches may interfere with axial movement of the three-dimensional cam 540. This would hinder with smooth varying of the opening and closing timing and lift amount of the associated valve 543.

SUMMARY OF THE INVENTION

Accordingly, it is an objective of the present invention to provide a three-dimensional cam and a valve drive apparatus that enable smooth relative movement between the cam surface and the cam follower without damage or wear of the cam surface and cam follower. It is a further objective of the present invention to provide a method and apparatus for measuring the profile of such three-dimensional cam.

To achieve the above objectives, the present invention provides a cam mechanism including a cam, a cam follower, and a driven member. The cam rotates about its axis to drive the driven member with the cam follower. The cam mechanism further includes a cam surface defined on the cam to slidably engage the cam follower. The cam surface has a profile that varies continuously in the direction of the cam axis. The cam moves axially and changes the position of the cam surface with respect to the cam follower to vary the behavior of the driven member. A slide surface is defined on the cam follower to slidably engage the cam surface. At least one of the cam surface and the slide surface is convexly arched in the direction of the cam axis.

The above cam mechanism is preferably applied to a valve drive apparatus of an automobile engine.

In another aspect of the present invention, a cam for driving a driven member with a cam follower is provided. The cam is rotatable about its axis and has a cam surface to slidably engage the cam follower. The cam surface has a profile that varies continuously in the direction of the cam axis and is convexly arched in the direction of the cam axis.

In a further aspect of the present invention, a cam follower is provided. The cam follower is arranged between a cam and a driven member to convey the motion of the cam to the driven member. The cam rotates about its axis and has a cam surface to slidably engage the cam follower. The cam surface has a profile that varies continuously in the direction of the cam axis. The cam follower has a slide surface to slidably engage the cam surface. The slide surface has edges. The slide surface is convexly arched in the direction of the cam axis at least at the edges.

In a further aspect of the present invention, a measuring tool is provided. The measuring tool is used to measure the profile of a cam surface defined on a cam that rotates about its axis. The measuring tool includes a contact element having a flat measuring surface for contacting the cam surface. A holder supports the contact element pivotally about a pivot axis extending perpendicular to the cam axis. The measuring surface includes the pivot axis and has a portion that constantly contacts the cam surface. The holder moves along a moving axis perpendicular to the pivot axis during rotation of the cam. The position of the holder on the moving axis indicates the radius of the cam surface at a location where the measuring surface contacts the cam surface.

In a further aspect of the present invention, an apparatus for measuring the profile of a cam surface defined on a cam that rotates about its axis is provided. The measuring apparatus includes a measuring tool faced toward the cam surface. The measuring tool includes a contact element having a flat measuring surface slidably engaged with the cam surface and a holder for supporting the contact element pivotally about a pivot axis, which extends perpendicular to the cam axis. The measuring surface includes the pivot axis and has a portion that constantly contacts the cam surface. The measuring tool moves along a moving axis during rotation of the cam. The position of the measuring tool along the moving axis indicates the radius of the cam surface at a location where the measuring surface contacts the cam surface. A rotary drive means rotates the cam about its axis to angularly vary the part of the cam surface that the measuring surface contacts. A moving means moves the cam axially to axially vary the part of the cam surface that the measuring surface contacts. A measuring means measures the position of the measuring tool along its moving axis in association with the angular and axial positions of the part of the cam surface that the measuring surface contacts.

In a further aspect of the present invention, a method for measuring the profile of a cam surface defined on a cam that rotates about its axis is provided. The measuring method includes the step of facing a measuring tool toward the cam surface. The measuring tool includes a contact element having a flat measuring surface slidably engaged with the cam surface and a holder for supporting the contact element pivotally about a pivot axis extending perpendicular to the cam axis. The measuring surface includes the pivot axis and has a portion that constantly contacts the cam surface. The measuring tool moves along a moving axis during rotation of the cam. The position of the measuring tool along the moving axis indicates the radius of the cam surface at a location where the measuring surface contacts the cam surface. The measuring method further includes the steps of rotating the cam about its axis to angularly vary the part of the cam surface that the measuring surface contacts, moving the cam axially to axially vary the part of the cam surface that the measuring surface contacts, and measuring the position of the measuring tool along its moving axis in association with the angular and axial positions of the part of the cam surface that the measuring surface contacts.

In a further aspect of the present invention, a method for measuring the profile of a cam surface defined on a cam that rotates about its axis is provided. The cam surface has a profile that varies continuously in the direction of the cam axis. The cam surface is convexly arched in the direction of the cam axis. The measuring method includes the steps of measuring a physical quantity representing the cam surface radius in association with the angular position and axial position of a measured location on the cam surface, and inspecting the cam by plotting distribution patterns. Each distribution pattern is based on measurement values taken along the cam surface at the same angular position but at different axial positions. The inspection is performed by judging whether each distribution pattern represents a convex cam surface within a predetermined tolerance range to confirm that the cam is satisfactory.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 2:
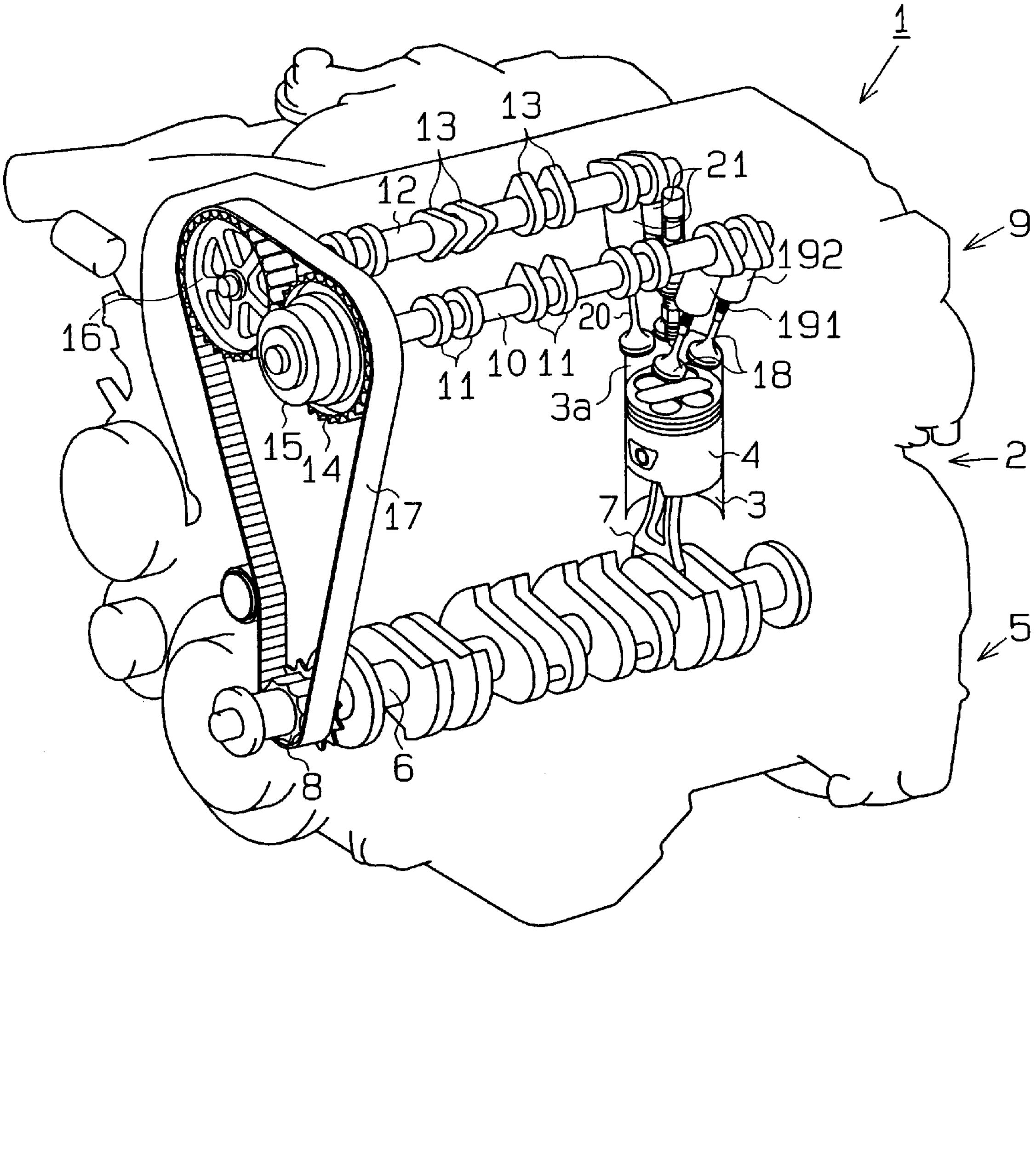
FIG. 2 is a perspective view showing an engine valve drive apparatus used to drive the valve of FIG. 1.

A valve drive apparatus employed in a double overhead cam (DOHC) engine 1 is shown in FIG. 2. The engine 1 includes cylinders 3 that are each provided with four valves (two intake valves and two exhaust valves).

The engine 1 has a cylinder block 2, which houses the cylinders 3. A piston 4 is retained in each cylinder 3. Each piston 4 is connected to a crankshaft 6 by a connecting rod 7. The crankshaft 6 is supported in a crank case 5 and has an end to which a timing pulley 8 is fixed.

A cylinder head 9 is mounted on the cylinder block 2. An intake valve camshaft 10 is supported in the cylinder head 9 by a plurality of bearings (not shown) so that the camshaft 10 is rotatable and axially movable. Two intake valve cams 11 are formed integrally with the camshaft 10 in correspondence with each cylinder 3. In the same manner, an exhaust valve camshaft 12 is supported in the cylinder head 9 by a plurality of bearings (not shown) so that the camshaft 12 is rotatable. Two exhaust valve cams 13 are formed integrally with the camshaft 10 in correspondence with each cylinder 3.

The intake valve camshaft 10 has an end to which a timing pulley 14 and a shaft shifting mechanism 15 are connected. The exhaust valve camshaft 12 also has an end to which a timing pulley 16 is fixed. The camshaft timing pulleys 14, 16 are connected to the crankshaft timing pulley 8 by a timing belt 17. Thus, the rotation of the crankshaft 6 rotates the intake valve camshaft 10 and the exhaust valve camshaft 12.

Two intake valves 18 are provided for each cylinder 3. Each intake valve 18 is connected to one of the associated intake valve cams 11 by a valve lifter 191 or 192. The valve lifters 191, 192 are each slidably retained in a lifter bore (not shown) provided in the cylinder head 9.

Two exhaust valves 20 are provided for each cylinder 3. Each exhaust valve 20 is connected to one of the associated exhaust valve cams 13 by a valve lifter 21. Each valve lifter 21 is slidably retained in a lifter bore (not shown) provided in the cylinder head 9.

A combustion chamber 3*a* is defined in each cylinder by the associated piston 4. Each combustion chamber 3*a* is connected to an intake passage and an exhaust passage (neither shown). Each pair of intake valves 18 is arranged in the intake passage to control the flow of air sent from the intake passage to the associated combustion chamber 3*a*. Each pair of exhaust valves 20 is arranged in the exhaust passage to control the flow of exhaust gases from the associated combustion chamber 3*a* to the exhaust passage. The rotation of the intake valve camshaft 10 causes the cams 11 to selectively open and close the intake valves 18 with the associated valve lifter 191, 192. The rotation of the exhaust valve camshaft 13 causes the cams 13 to selectively open and close the exhaust valves 20 with the valve lifters 21.

Figure 1:
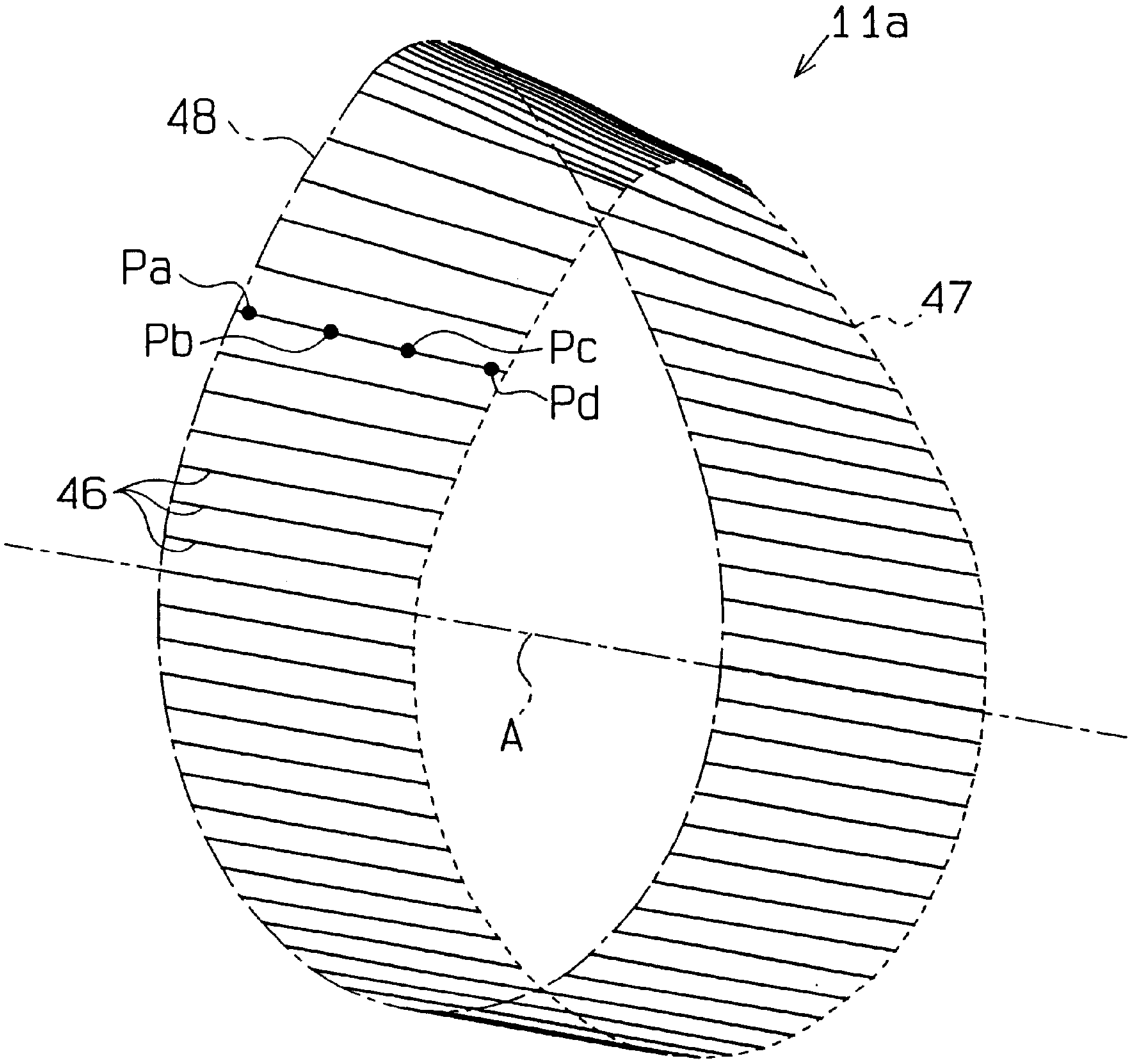
FIG. 1 is a perspective view showing the cam surface shape of an intake valve cam in a first embodiment according to the present invention.

As shown in the perspective view of FIG. 1, each intake valve cam 11 is a three-dimensional cam and includes a cam surface 11*a*. The uniformly dashed line represents one end of the intake valve cam 11 with respect to the camshaft axis A, or a cam profile 47 where the cam nose radius is smallest. The cam profile 47 minimizes the lift amount of the associated intake valve 18. The long and short dashed line represent the other end of the cam 11, or a cam profile 48 where the cam nose radius is greatest. The cam profile 48 maximizes the lift amount of the associated intake valve 18. As apparent from the drawing, the cam profile of the cam 11 varies continuously in the axial direction. Lines 46 shown in the drawing represent the same rotational phase on the cam surface 11*a*. That is, each line 46 represents the intersection of the cam surface 11*a* with a plane that contains the axis A. Although the drawing shows a limited number of lines 46, an infinite number of lines 46 may actually be defined along the cam surface 11*a*.

Figure 3:
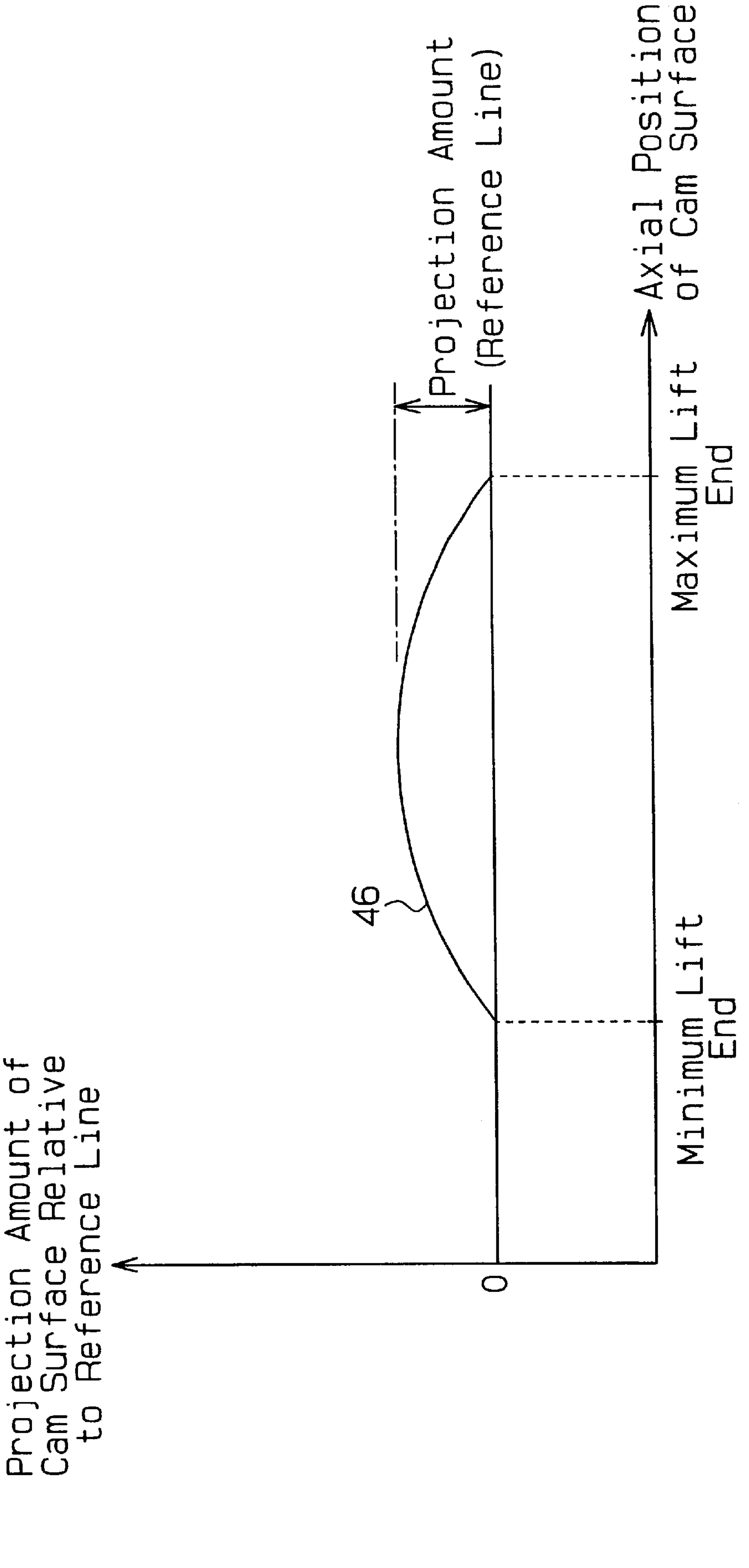
FIG. 3 is a graph showing the cam surface shape relative to the axial direction of the intake valve cam of FIG. 1.
Figure 27:
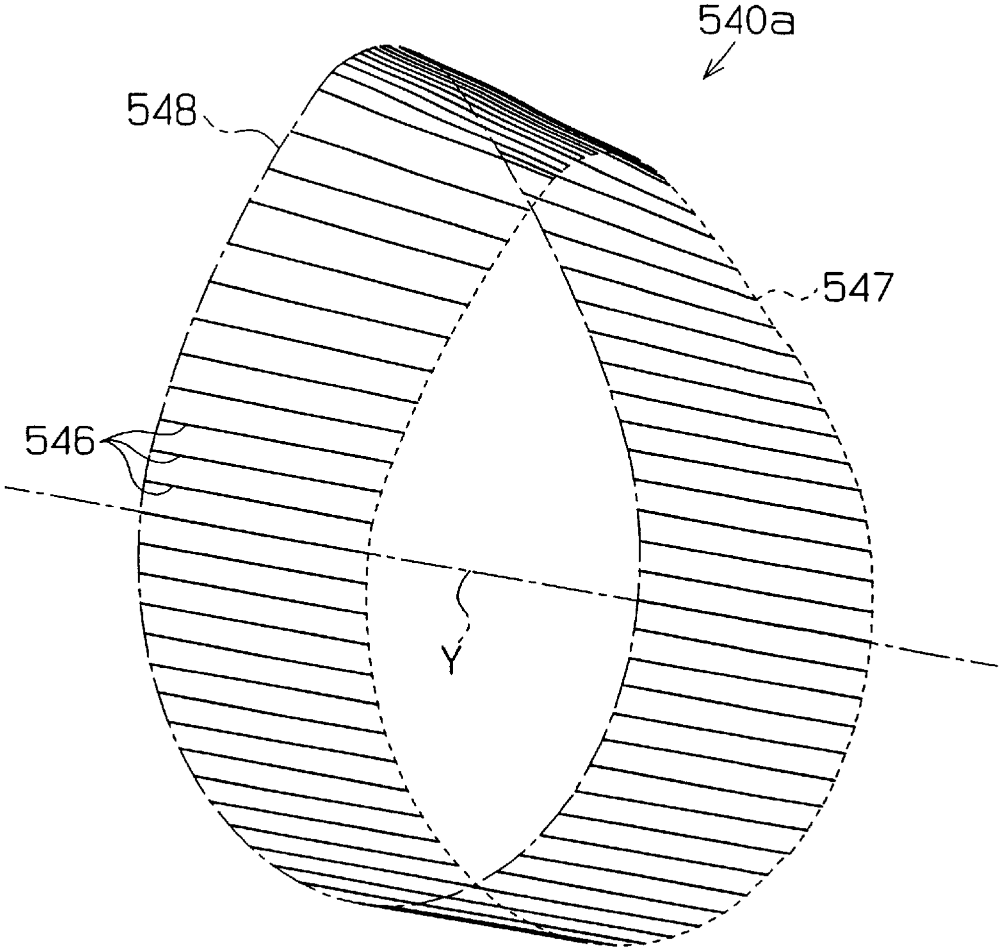
Fig.27 (Prior Art)
FIG. 27 is a perspective view showing the cam surface shape of a three-dimensional cam of the valve drive apparatus of FIG. 24.
Figure 28:
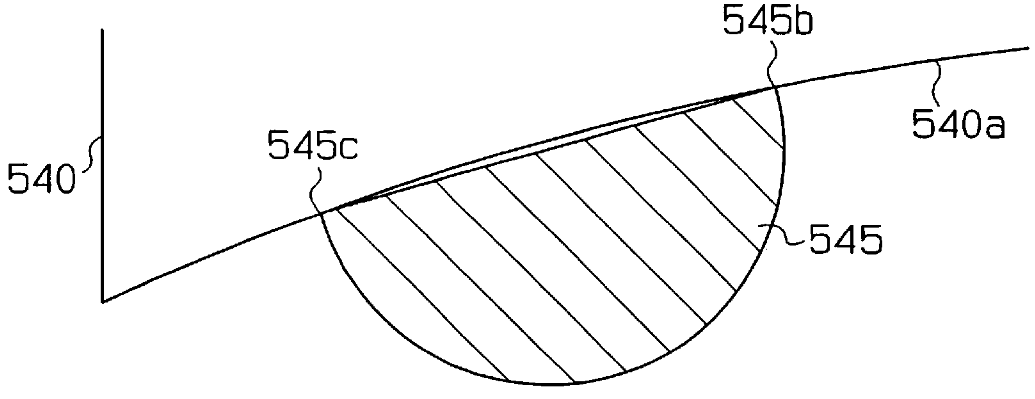
Fig.28 (Prior Art)
FIG. 28 is a partial enlarged view showing a state of contact between the cam surface of the cam of FIG. 27 and the cam follower.

As shown in FIG. 3, the cam surface 11*a* of the cam 11 differs from the cam surface 540*a* of the prior art cam 540 shown in FIG. 27 in that the cam surface 540*a* is convex in the axial direction A. The reference line shown in FIG. 3 represents a theoretical linear intersection between the cam surface 11*a* and a plane that includes the axis A. As apparent from the graph, the middle portion of the line 46 representing the cam surface 11*a* is arched outwards. In other words, the cam surface 11*a* is convex. The projecting amount of the line 46 with respect to the reference line is exaggerated in FIG. 3. The actual projection amount is about 1 $\mu$m to 20 $\mu$m.

Figure 4:
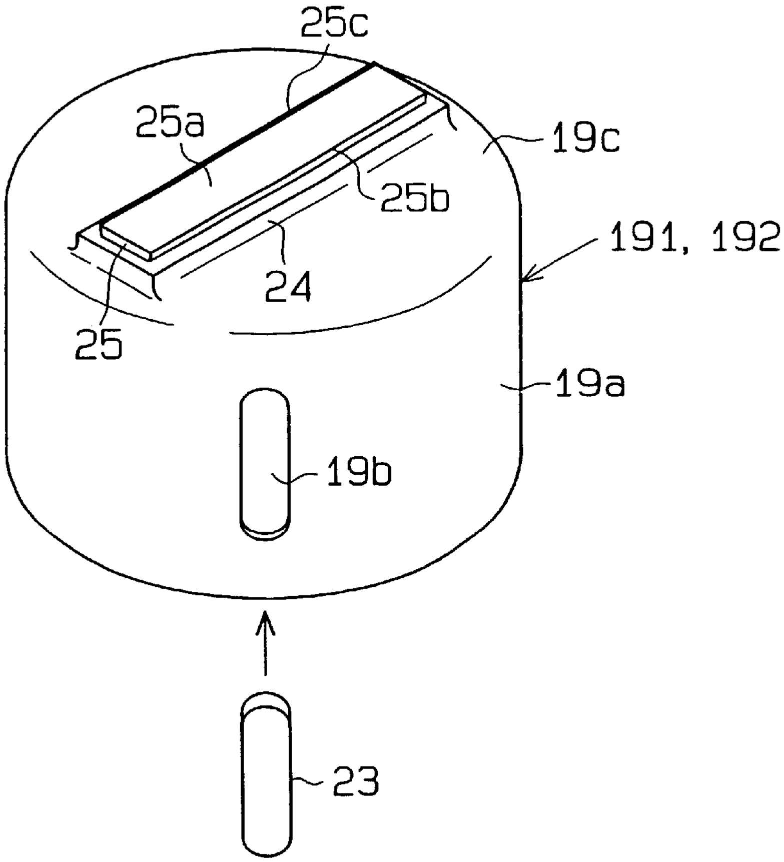
FIG. 4 is a perspective view of a valve lifter employed in the valve drive apparatus of FIG. 2.

As shown in FIG. 4, the valve lifters 191, 192, which are identical to each other, are cylindrical. A guide 23 is provided on the peripheral surface 19*a* of each valve lifter 191, 192. The guide 23 is pressed into or welded into a slot 19*b* extending along the peripheral surface 19*a*. An engaging portion (not shown), which may be a groove or the like, is formed in the wall of the associated lifter bore to engage the guide 23 so that rotation of the valve lifter 191, 192 in the lifter bore is restricted while axial movement is permitted.

Figure 5A:
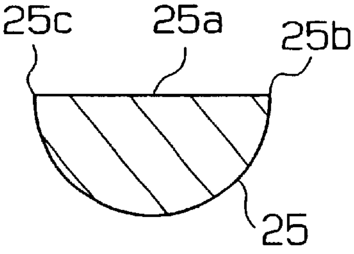
FIG. 5(*a*) is a cross-sectional view of a cam follower of the valve lifter shown in FIG. 4, and FIG. 5(*b*) is a side view of the cam follower.
Figure 5B:
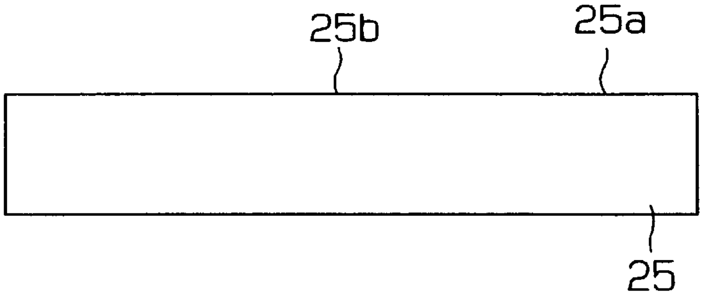

Each valve lifter 191, 192 has a top surface 19*c* that includes a cam follower seat 24. A cam follower 25 is tiltably held in each follower seat 24. FIGS. 5(*a*) and 5(*b*) are enlarged views showing the shape of the cam follower 25. The cam follower 25 has a flat slide surface 25*a*, which contacts the cam surface 11*a* of the associated cam 11, and a cylindrical surface, which is pivotally received in the seat 24. The long edges of the slide surface 25*a* are first and second edges 25*b*, 25*c*, which are continuous with the cylindrical surface.

Figure 6:
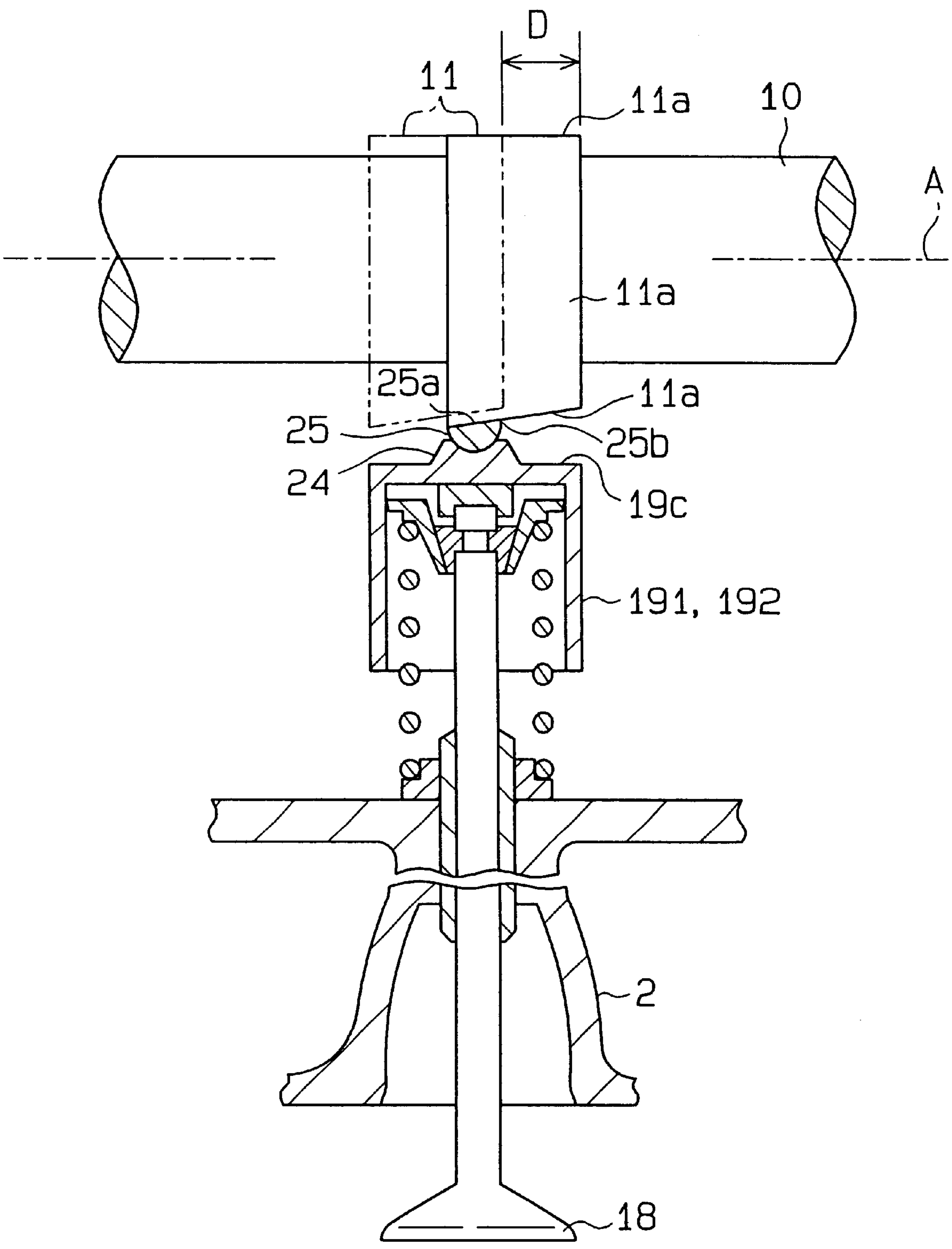
FIG. 6 is an enlarged cross-sectional view partially showing the valve drive apparatus of FIG. 2.

The shaft shifting mechanism 15 shown in FIG. 2 is a known mechanism driven by a hydraulic circuit (not shown) to move the intake valve camshaft 10 and its cams 11 in the axial direction in accordance with the operating conditions of the engine 1 (the conditions include at least the engine speed). As shown in FIG. 6, the shaft shifting mechanism 15 moves the camshaft 10 so that the point of contact between each cam surface 11*a* and the slide surface 25*a* moves between the position where the radius of the cam nose is smallest (refer to the long and short dashed line in FIG. 6) and the position where the cam nose radius is greatest (refer to the solid line in FIG. 6). In other words, each cam 11 is displaced within a range denoted by D. The movement of the camshaft 10 varies the lift amount of the intake valves 18 in accordance with the operating conditions of the engine 1.

Figure 7:
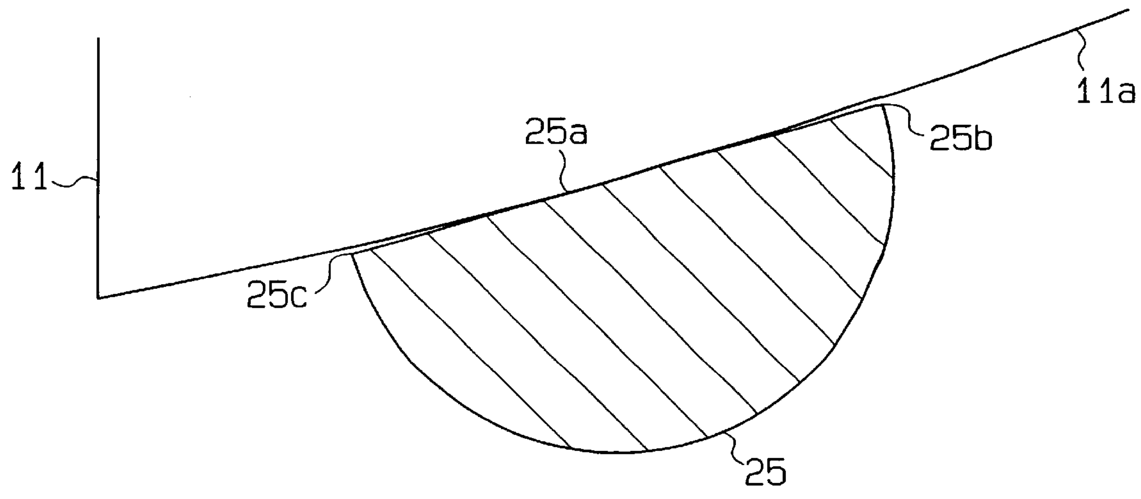
FIG. 7 is a partial enlarged cross-sectional view, as seen in the same direction as FIG. 6, showing contact between the cam surface of the intake valve cam shown in FIG. 1 and the cam follower.

The middle portion of the cam surface 11*a* of each intake cam 11 is convexly arched from the axial ends of the cam surface 11*a*, as shown in FIG. 3. Thus, the middle portion of the cam surface 11*a* is not recessed regardless of machining tolerances. In other words, tolerances are taken into consideration when designing the cams 11 so that the middle portion of each cam surface 11*a* is higher than the axial ends of the cam surface 11*a*. Accordingly, as shown in FIG. 7, only the middle portion of the slide surface 25*a* of each cam follower 25 contacts the cam surface 11*a*. Thus, the edges 25*b*, 25*c* of the cam follower 25 do not contact the cam surface 11*a*.

As a result, the edges 25*b*, 25*c* of the cam follower 25 do not scrape off the lubricating oil film applied to the cam surface 11*a* during axial movement of the associated cam 11. This maintains sufficient lubrication between the cam surface 11*a* and the cam follower 25. Thus, smooth relative movement is carried out without causing damage or wear of the cam surface 11*a* and the cam follower 25. In addition, the cam surface 11*a* is prevented from becoming uneven when wear occurs. Furthermore, scratches, which are formed when the edges 25*b*, 25*c* of the cam follower 25 contact the cam surface 11*a*, and biased wear of the edges 25*b*, 25*c* are prevented. Thus, when each cam 11 moves axially, there is no interference between the associated cam follower 25 and scratches or an uneven surface. Accordingly, the lift amount and opening and closing timing of the intake valves 18 are varied smoothly.

A second embodiment according to the present invention will now be described with reference to the FIGS. 8 to 18. The second embodiment pertains to an apparatus for measuring the cam profile of the intake cam 11 of the first embodiment.

Figure 8:
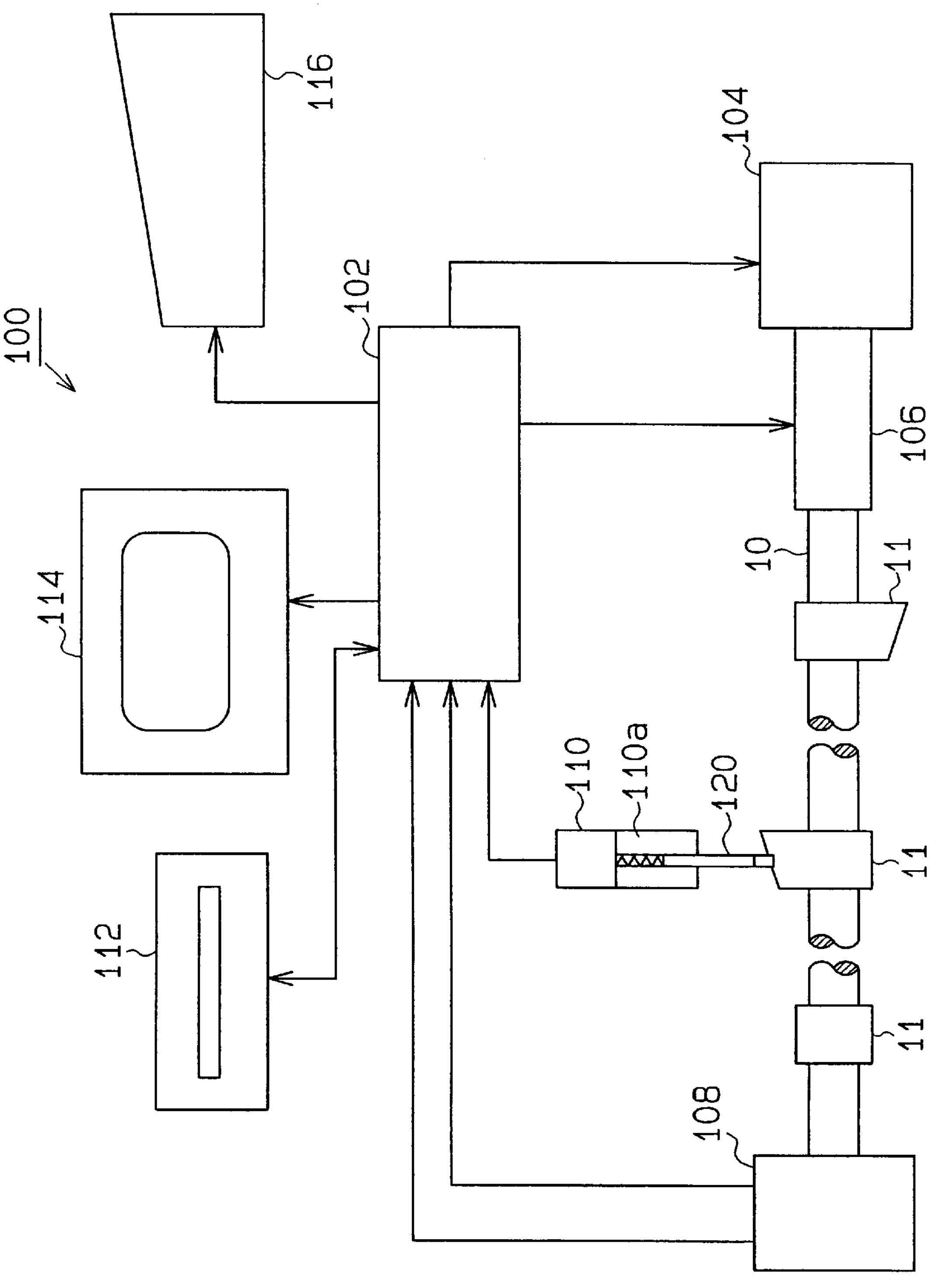
FIG. 8 is a block diagram showing a three-dimensional measuring apparatus employed in a second embodiment according to the present invention.

FIG. 8 is a block diagram showing the structure of a three-dimensional cam profile measuring apparatus 100. The measuring apparatus 100 includes a control circuit 102, a rotary drive device 104, a linear drive device 106, a scale device 108, a measuring unit 110, an external memory 112, a display device 114, and a printer 116. Although not shown in the diagram, the measuring apparatus 100 further includes a host computer and a communication circuit.

The control circuit 102 is a computer system that incorporates a central processing unit (CPU), a read only memory (ROM), a random access memory (RAM), an input/output interface, a bus line, an internal memory, and other devices. The CPU executes necessary computations based on programs, which are stored in the ROM, the RAM, the external memory 112, and other devices, using data sent from the scale device 108 and the measuring unit 110 via the input/output interface. The CPU also stores computation results (data related to the cam profile of the cam surface 11*a* of each intake cam 11) in the external memory 112 through the input/output interface, displays the computation results on the display device 114, and prints out the computation results with the printer 116.

The rotary drive device 104 includes a stepping motor, a servomotor, or the like. The control circuit 102 sends command signals to the rotary drive device 104 to adjust the rotary phase of the intake valve camshaft 10 when measuring cam profiles.

The linear drive device 106 is constituted by a linear movement mechanism, which includes a motor associated with a linear solenoid or ball screw. The control circuit 102 sends command signals to the linear drive device 106 to adjust the axial position of the intake valve camshaft 10.

The scale device 108 includes a rotary position sensor and a linear position sensor. The rotary position sensor employs a synchro, a resolver, a rotary encoder, or the like. The linear position sensor employs a potentiometer, a differential transformer, a scale, or the like. The scale device 108 measures the precise rotary phase and axial position of the camshaft 10, which is rotated by the rotary drive device 104 and moved axially by the linear drive device 106. Signals corresponding to the measurement results are sent to the control circuit 102.

The measuring unit 110 includes a three-dimensional cam profile measuring tool 120 and a linear position sensor, which employs a potentiometer, a differential transformer, a scale, or the like. The measuring unit 110 has a supporter 110*a* for supporting the measuring tool 120. The supporter 110*a* permits movement of the measuring tool 120 along a moving axis G (described later) and urges the measuring tool 120 toward the intake valve cam 11. The measuring unit 110 measures the movement distance of the measuring tool 120 when the measuring tool 120 is in contact with the cam surface 11*a* of the intake valve cam 11. Signals corresponding to the measurement results are sent to the control circuit 102.

Figure 9:
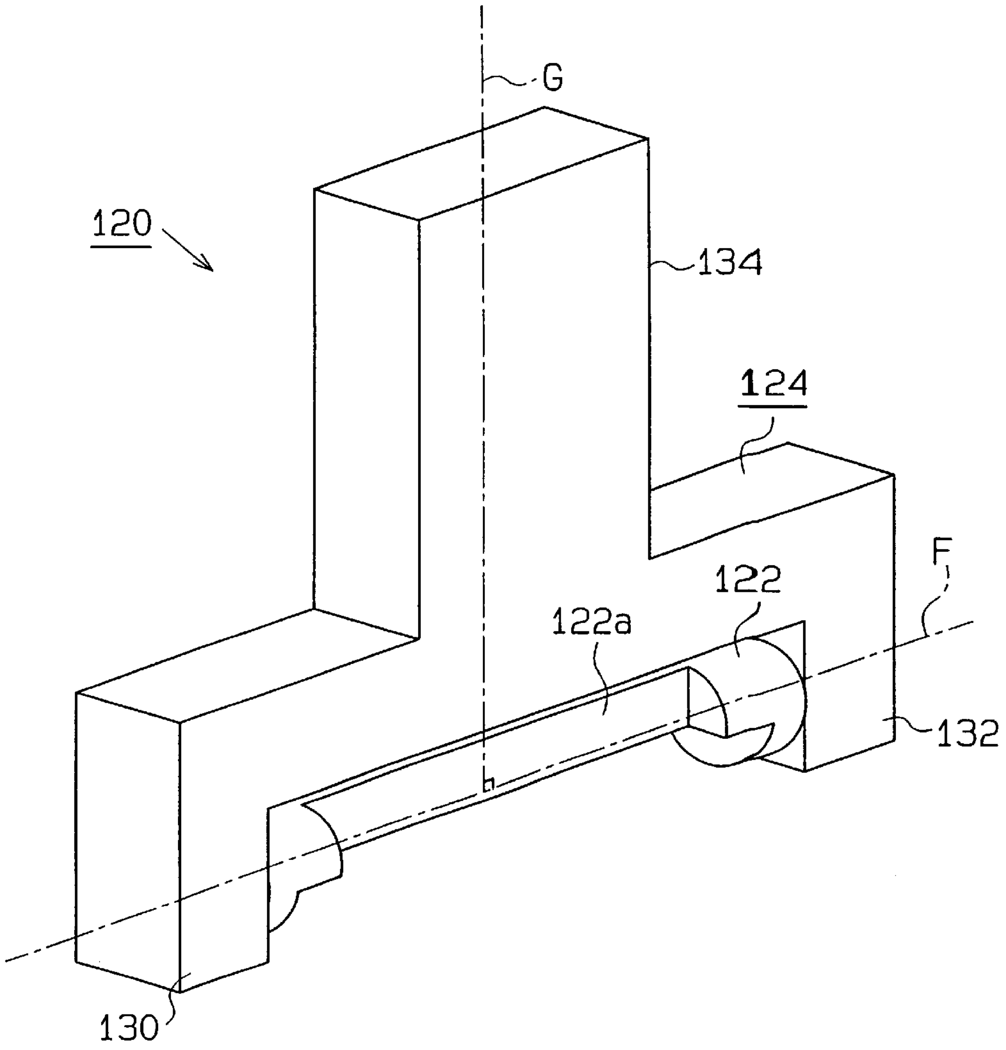
FIG. 9 is a perspective view showing a three-dimensional cam profile measuring tool employed in the measuring apparatus of FIG. 8.
Figure 10:
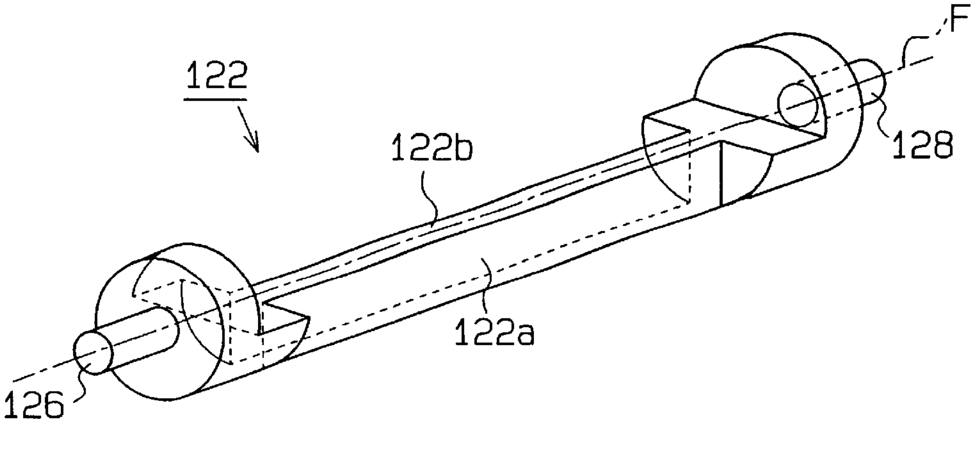
FIG. 10 is a perspective view showing a contact element of the three-dimensional profile measuring tool of FIG. 9.

The structure of the profile measuring tool 120 will now be described. As shown in FIG. 9, the measuring tool 120 includes a contact element 122 and a holder 124, which holds the ends of the contact element 122. As shown in FIG. 10, the contact element 122 is generally cylindrical and has shafts 126 and 128 projecting from its ends. The contact element 122 shown in FIG. 10 is illustrated upside down with respect to that shown in FIG. 9. The holder 124 has two arms 130, 132 to hold the shafts 126, 128 so that the contact element 122 is supported pivotally about its axis F.

The middle portion 122*a* of the contact element 122 is cut in half axially along a plane that includes the contact axis F. The contact element 122 is also cut at side to form a plate-like portion as shown in FIG. 10. The plate-like middle portion 122*a* has a measuring surface 122*b*, which includes the axis F. The contact element 122 is made of cemented carbide, and the measuring surface 122*b* is finished with extremely high accuracy.

Figure 11:
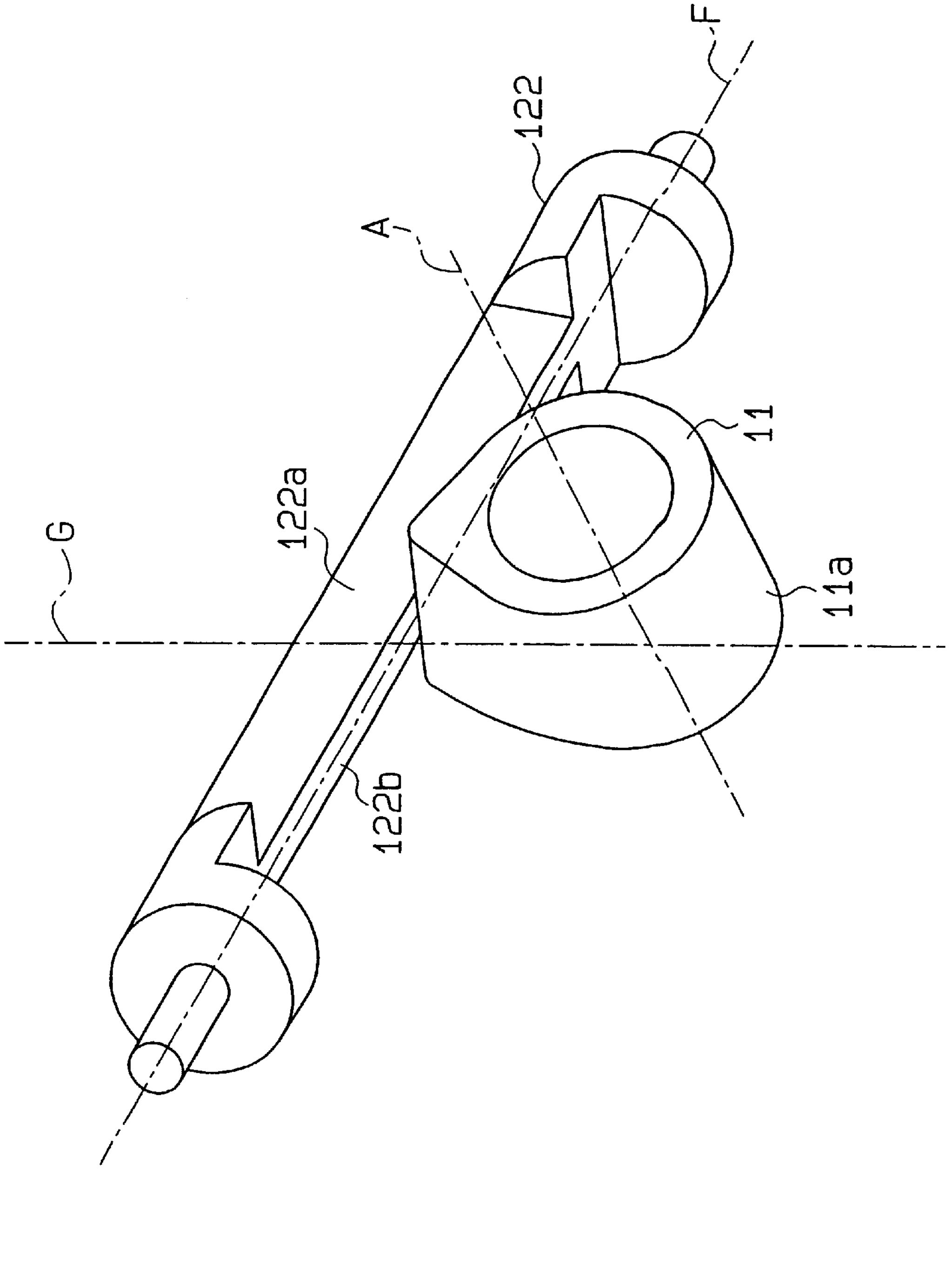
FIG. 11 is a perspective view showing the contact element of FIG. 10 contacting the intake valve cam.

The holder 124 has a base 134 to which the two arms 130, 132 are connected. The base 134 is supported by the supporter 110*a* of the measuring unit 110. The supporter 110*a* holds the base 134 so as to permit movement of the base 134 along the moving axis G, which extends perpendicular to the axis F of the contact element 122, while preventing rotation of the base 134 about the axis G. As shown in FIG. 11, during profile measurement of each intake valve cam 11, the measuring surface 122*b* is pressed against the cam surface 11*a* of the cam 11 so that the axis F of the contact element 122 is perpendicular to the axis A of the cam 11.

Figure 12A:
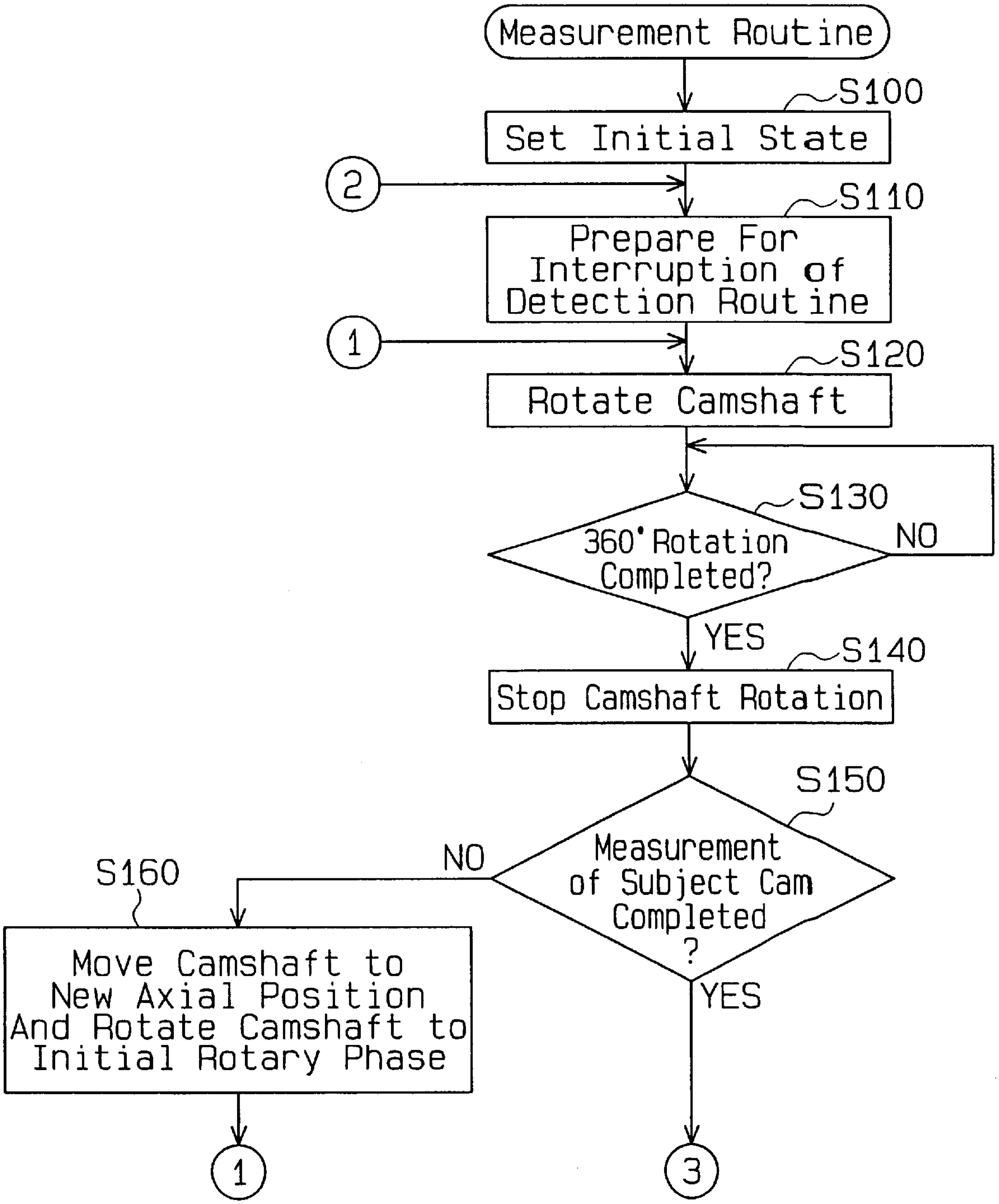
FIGS. 12(*a*) and 12(*b*) are flowcharts showing the inspection routine executed by the measuring apparatus of FIG. 8.
Figure 12B:
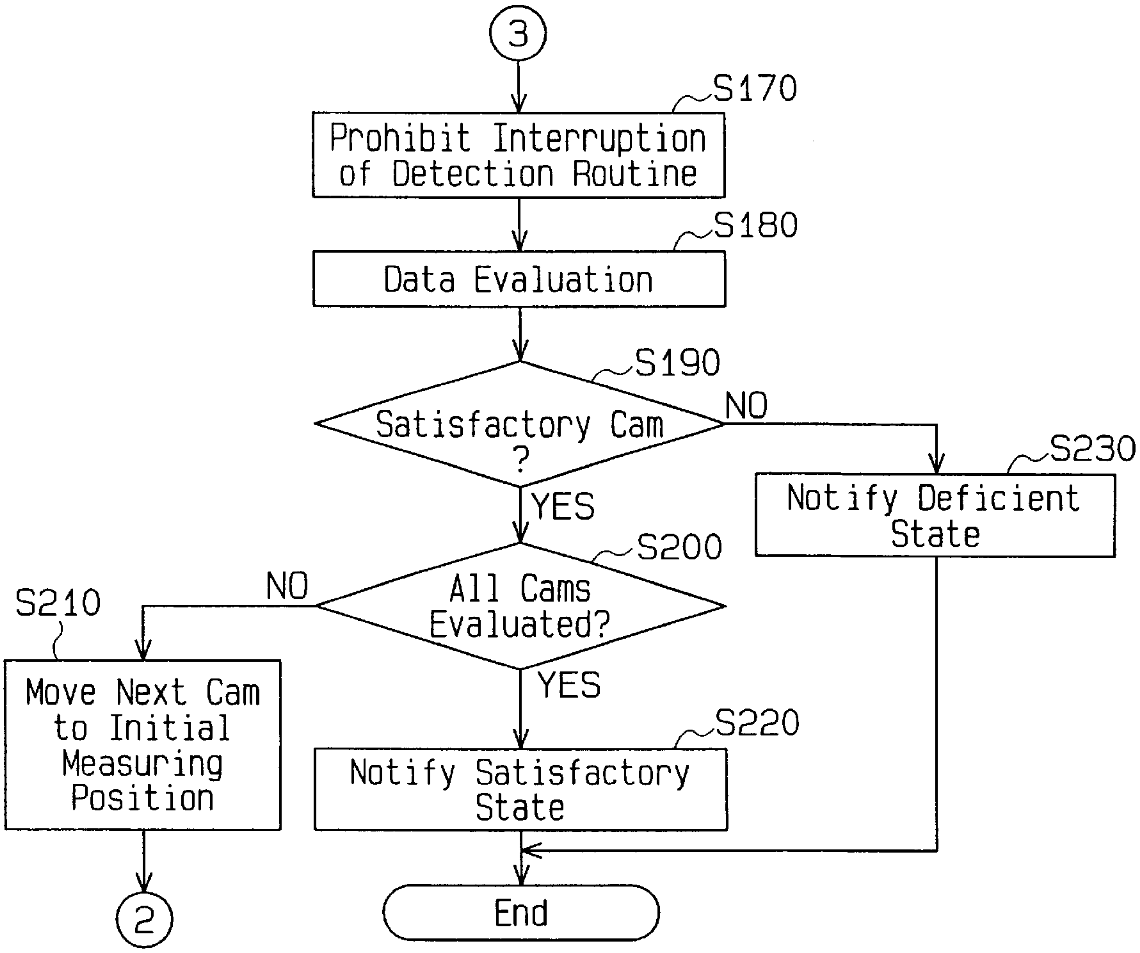
Figure 13:
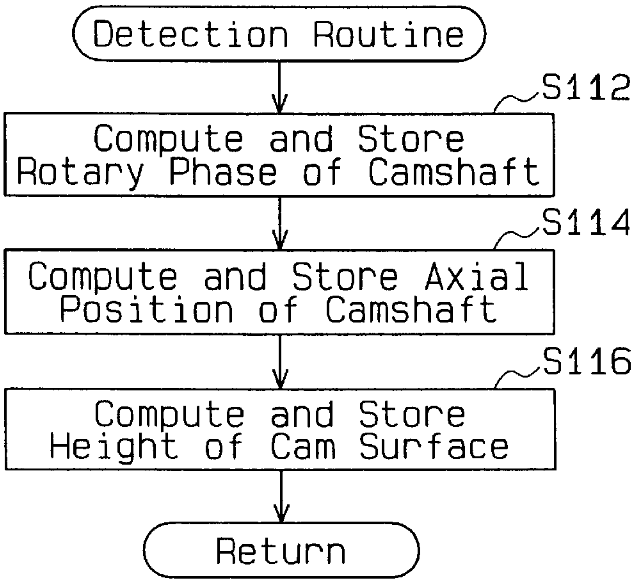
FIG. 13 is a flowchart showing the measurement routine executed by the measuring apparatus of FIG. 8.

The profile measurement is executed by the control circuit 102 in accordance with the flowchart shown in FIGS. 12 and 13. To carry out the profile measurement, the camshaft 10 is either manually or automatically set in the measuring apparatus 100, as shown in FIG. 8.

When starting measurement, the control circuit 102 first performs step S100 and sets the initial state. That is, the control circuit 102 drives the rotary drive device 104 to arrange the camshaft 10 at an initial rotary phase and drives the linear drive device 106 to arrange the camshaft 10 at an initial axial position to initiate measurement.

At step S110, the control circuit 102 prepares for interruption of the measurement routine, which is illustrated in FIG. 13. The measurement routine is executed in an interrupting manner each time the camshaft 10 is rotated by a predetermined angle (e.g., 0.5°). After step S110, the control circuit 102 executes the routine of FIG. 13 based on signals sent from the scale device 108 each time the camshaft 10 is rotated by the predetermined angle.

When entering the routine of FIG. 13, the control circuit 102 first performs step S112 and computes the present rotary phase of the camshaft 10 based on the number of interruptions from the initial rotary phase. The control circuit 102 then stores the data related to the present rotary phase in the RAM or the external memory 112.

At step S114, the control circuit 102 reads the axial position of the camshaft 10 corresponding to the present rotary phase from signals sent from the scale device 108. The control circuit 102 then stores the data related to the present axial position in the RAM or the external memory 112 in association with the rotary phase data obtained in step S112.

At step S116, the control circuit 102 computes the height of the cam surface 11*a* of the present subject cam 11 from signals sent from the measuring unit 110. The control circuit 102 then stores the height in the RAM or external memory 112 in association with the rotary position data, obtained in step S112, and the axial position data, obtained in step S114. The height of the cam surface 11*a* is represented by either the radial distance between the axis A of the cam 11 and the cam surface 11*a* or by the radial projection amount of the cam surface 11*a* from the radius of the cam base circle.

After completing the measurement routine, the control circuit 102 keeps the measurement routine ready until the next interruption cycle.

The control circuit 102 proceeds from step S110 to step S120 and sends a command signal to the rotary drive device 104 to start the rotation of the camshaft 10. During rotation of the camshaft 10, the scale device 108 continuously informs the control circuit 102 of changes in the rotary phase of the camshaft 10. The control circuit 102 refers to the signals sent from the scale device 108 to execute the measurement routine of FIG. 13 and obtain measurement data each time the camshaft 10 is rotated by the predetermined angle.

At step S130, the control circuit 102 determines whether or not the camshaft 10 has completed a full rotation, or whether or not the camshaft 10 has been rotated by 360°. If the camshaft 10 has not been rotated by 360°, the control circuit 102 waits until the camshaft 10 is rotated by 360°. Therefore, the height of the cam surface 11*a* is measured repetitively as the measurement routine is carried out each time the camshaft 10 is rotated by the predetermined angle until the camshaft 10 completes a full rotation. The axial position of the camshaft 10 is fixed during rotation. When the camshaft 10 completes a full rotation, the control circuit 102 proceeds to step S140 and sends a command to the rotary drive device 104 to stop the rotation of the camshaft 10.

At step S150, the control circuit 102 determines whether or not the measurement of the present subject cam 11 has been completed. More specifically, the control circuit 102 determines whether or not the measurement of the present subject cam 11 at all predetermined axial measurement positions and all rotary phases for each axial position has been completed.

If it is determined that all measurements of the present cam 11 have not been completed, the control circuit 102 proceeds to step S160. At step S160, the linear drive device 106 moves the camshaft 11 axially to measure a new position on the same cam 11. The control circuit 102 also drives the rotary drive device 104 to arrange the camshaft 10 at the initial rotary phase so that measurement can be commenced. The control circuit 102 then returns to step S120 and repetitively performs steps S120 to S160 until completing all of the required measurements of the cam 11.

At step S150, if it is determined that all measurements of the cam 11 have been completed, the control circuit 102 proceeds to step S170, which prohibits interruption of the measurement routine of FIG. 13.

Figure 14:
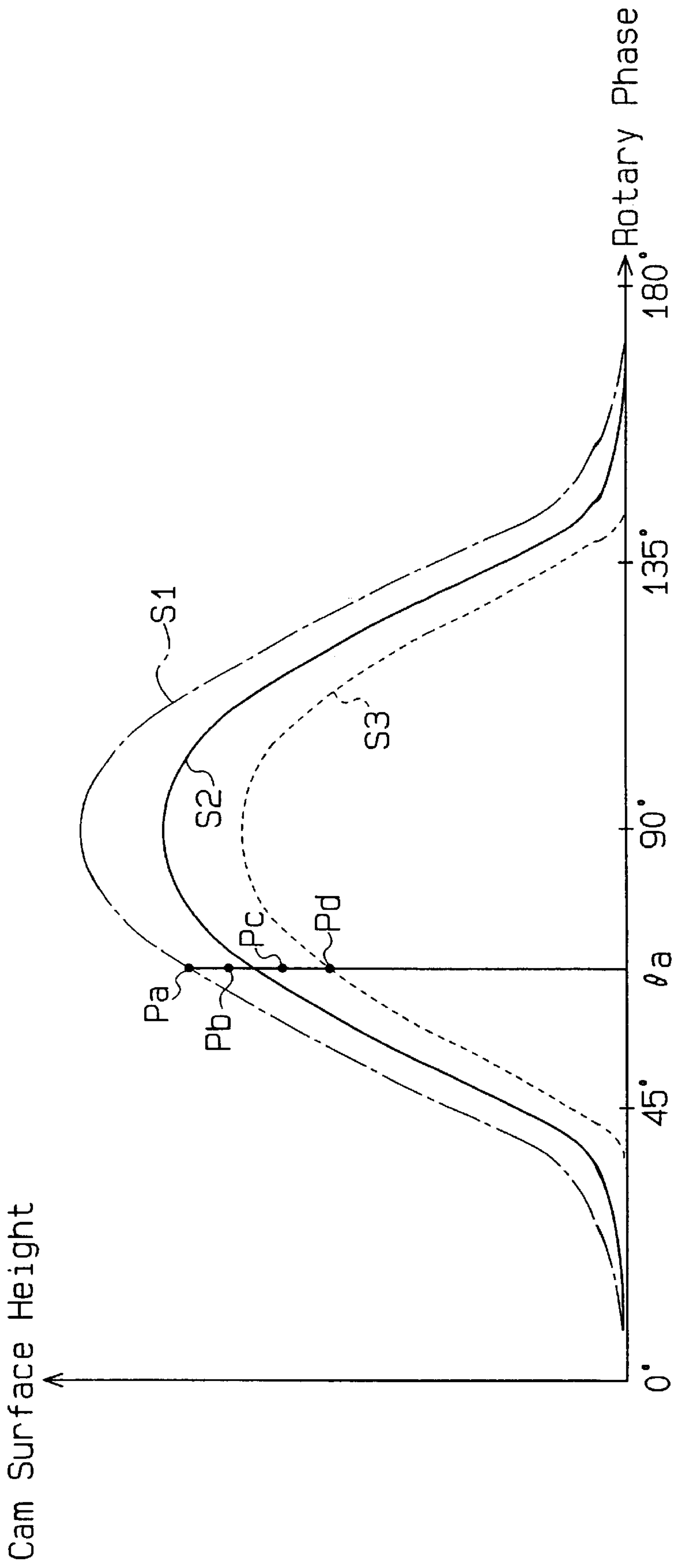
FIG. 14 is a graph showing an example of the results obtained by the measuring apparatus of FIG. 8.

The data obtained during measurement of the subject cam 11 represents the profile of the cam surface 11*a* of the cam 11. FIG. 14 is a graph showing some of the measurement data. The data for three representative cam profiles are shown in FIG. 14. The long and short dashed line represents the data taken on the axial end of the cam 11 where the cam nose radius is greatest, or cam profile S1. The uniformly dashed line represents the data taken on the other axial end of the cam 11 where the cam nose radius is smallest, or cam profile S3. The solid line represents the data taken at the axially middle position of the cam 11, or cam profile S2. In addition to the data of the cam profiles S1, S2, S3, there are actually much more data representing cam profiles of the same cam 11 taken at other axial positions.

The control circuit 102 proceeds to step S180 from step S170 to evaluate the data of the subject cam 11 and judge whether of not the cam 11 is satisfactory. The control circuit 102 determines whether or not the cam profile height data collected at each predetermined rotary phase by the measuring unit 110 represents a convexly arched cam surface. If it is determined that the cam 11 is convex at each rotary phase, or each angular position, the control circuit 102 judges whether or not the convexity is within a tolerable range. This evaluation is carried out for each measured rotary phase.

Figure 15:
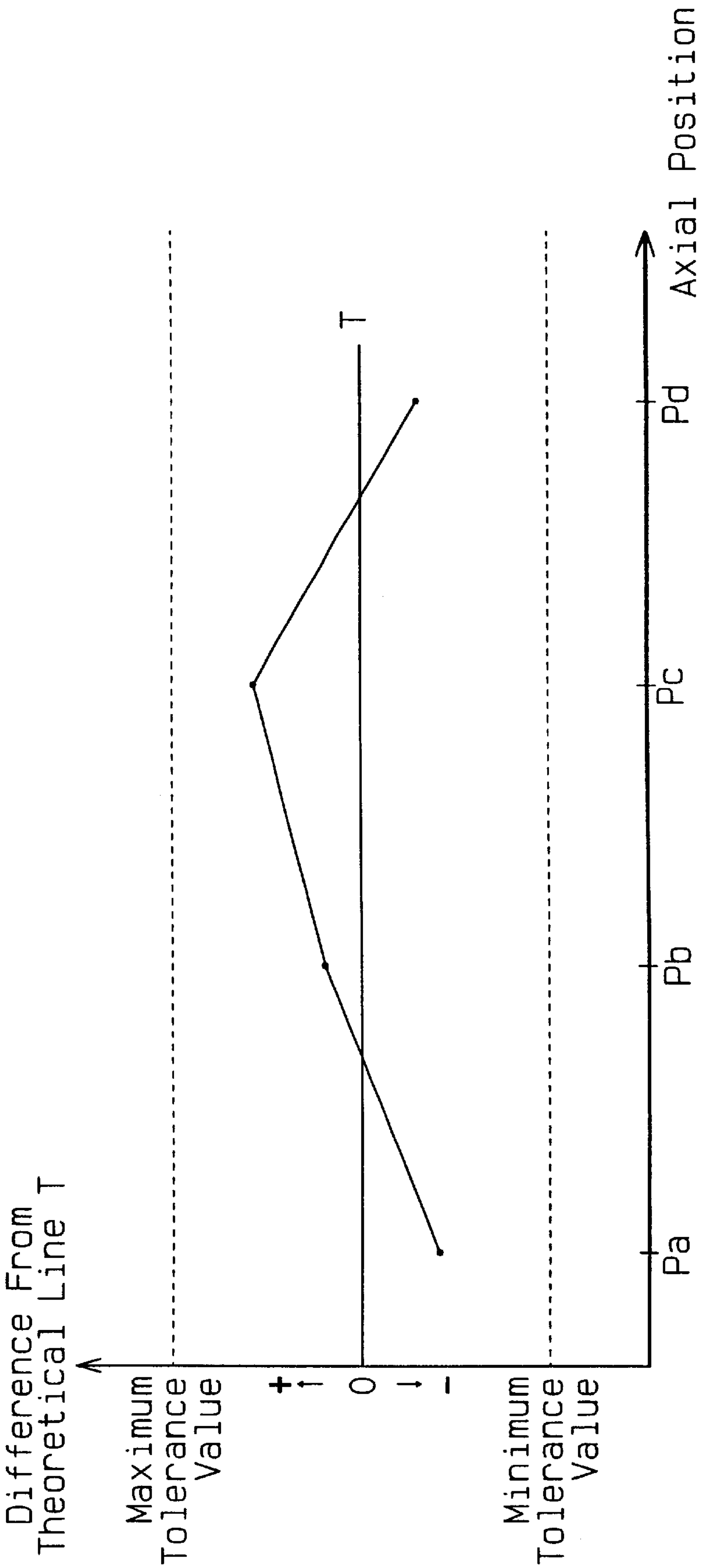
FIG. 15 is a graph showing an example of data taken by the measuring apparatus of FIG. 8 to inspect the intake valve cam.

The evaluation of the cam 11 will be described in detail now. For example, when measuring the height of the cam surface 11*a* at four different positions Pa, Pb, Pc, Pd on the same rotary phase θa, as shown in FIGS. 1 and 14, the measurement values of each position Pa, Pb, Pc, Pd may be plotted as shown in the graph of FIG. 15. In the graph, the horizontal line T represents a theoretical line located at the same rotary phase as the positions Pa, Pb, Pc, Pd, or rotary phase θa. The theoretical line T corresponds to a straight line inclined with respect to the axis of the cam 11 like the lines 546 of the prior art cam 540 shown in FIG. 27. The graph of FIG. 15 plots the difference between the measurement value indicating the height of the cam surface 11*a* at each position Pa, Pb, Pc, Pd and the theoretical line T. The range of tolerance is set within a maximum tolerance value, which is set at the positive side of the theoretical line T (or zero), and a minimum tolerance value, which is set at the negative side of the theoretical line (or zero). If the measurement value is on the positive side of the theoretical line T, the corresponding position on the cam surface 11*a* is higher than the theoretical line T. That is, the cam radius is less than that of the line T at that position. If the measurement value is on the negative side of the theoretical line T, the corresponding position on the cam surface 11*a* is lower, or has a smaller radius, than the theoretical line T.

As apparent from FIG. 15, positions Pb, Pc, which are located at the middle portion of the cam surface 11*a*, are higher than positions Pa, Pd, which are located at the ends of the cam surface 11*a* on the same rotary phase θa. In other words, the cam surface 11*a* is convex so that the middle portion is higher than the ends. Furthermore, the heights of the positions Pa, Pb, Pc, Pd are all included within the tolerance range.

In this manner, if the distribution pattern shows that the middle portion of the cam surface 11*a* is convexly arched from the ends at all measured rotary phases and if the height, or radius, of the cam surface is always included within the tolerance range, the control circuit 102 determines that the cam 11 is satisfactory in step S180.

At step S190, the control circuit 102 determines whether or not the subject cam 11 was evaluated as being satisfactory in step S180. If the cam 11 was judged as being satisfactory, the control circuit 102 proceeds to step S200 and determines whether or not the evaluation of all the cams 11 on the camshaft 10 has been finished. If it is determined that there are cams 11 that have not yet been evaluated, the control circuit 200 proceeds to step S210 and moves the camshaft 10 to initiate measurement of the next cam 11. More specifically, the control circuit 102 drives the linear drive device 106 to axially move the next cam 11 to the initial measurement position and drives the rotary drive device 104 to rotate the cam 11 to the initial rotary phase. When the cam 11 is positioned, the contact element 122 of the profile measuring tool 120 is in contact with the cam surface 11*a* of the cam 11.

The control circuit 103 then returns to step S110 shown in FIG. 12(*a*) and sequentially carries out steps S110 to S160 on the subject cam 11. Steps S110 to S210 are repetitively performed as long as the control circuit 102 judges that the subject cam 11 is satisfactory in steps S180, S190 and that all the cams 11 have not yet been measured in step S200.

The control circuit 102 proceeds to step S220 when the cam profiles of all of the cams 11 on the camshaft 10 have been measured and when it has been determined that all cams 11 are satisfactory. At step S220, the control circuit 102 generates a message that all of the cams 11 of the camshaft 10 have passed the cam surface inspections. For example, the word "satisfactory" together with an inspection number may be displayed on the display device 114 or may be printed out by the printer 116. The control circuit 102 may also store the inspection result together with the inspection number in the external memory 112. Furthermore, data related to the inspection result may be transmitted to the host computer, which is connected to the control circuit 102.

Figure 16:
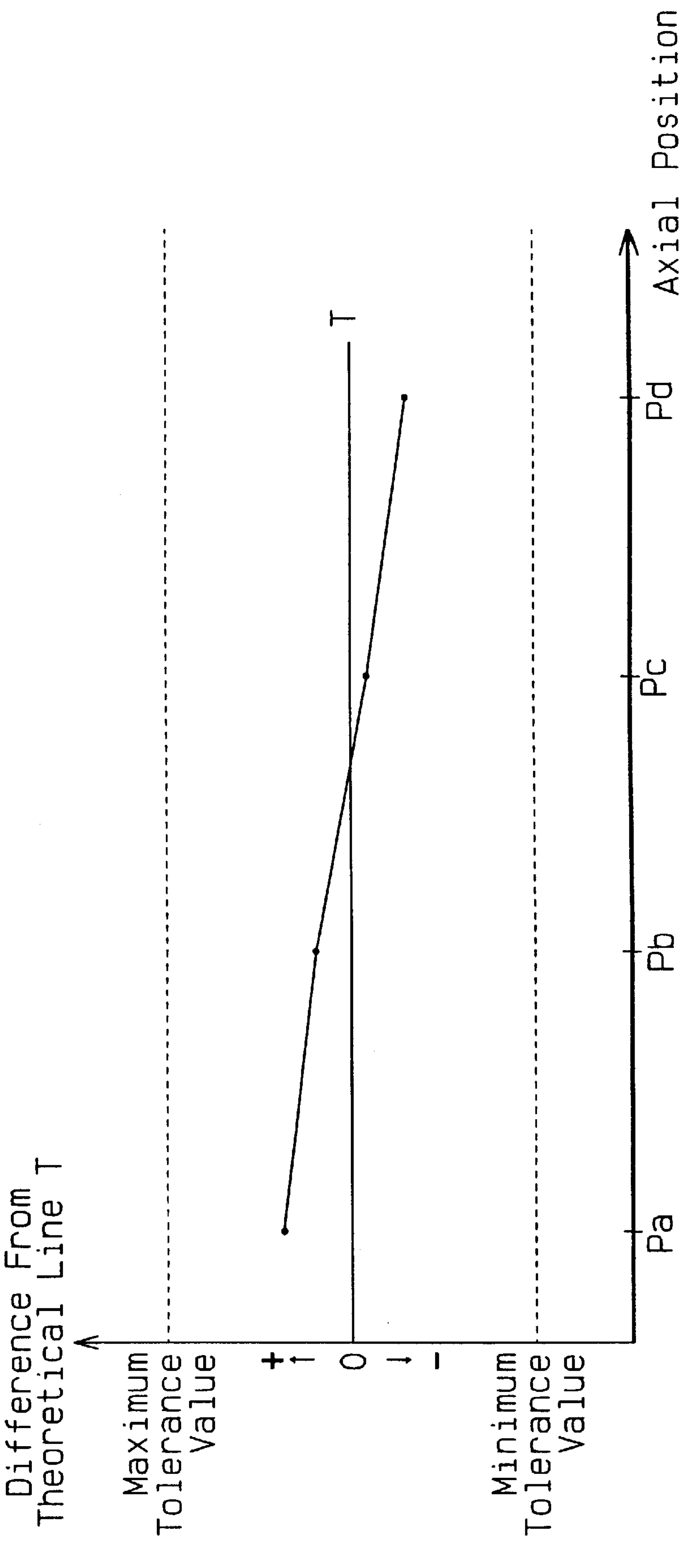
FIG. 16 is a graph showing an example of data taken by the measuring apparatus of FIG. 8 to inspect the intake valve cam.
Figure 17:
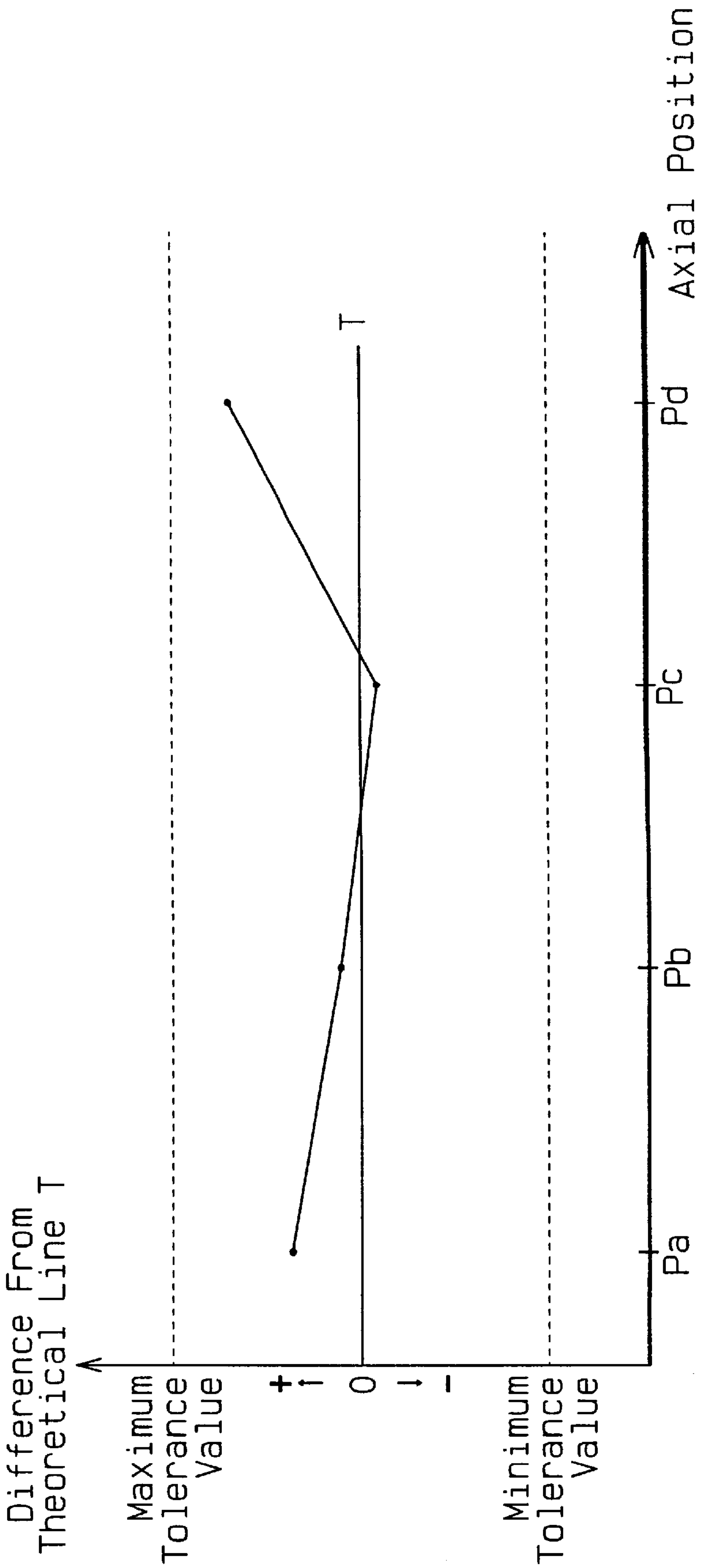
FIG. 17 is a graph showing an example of data taken by the measuring apparatus of FIG. 8 to inspect the intake valve cam.
Figure 18:
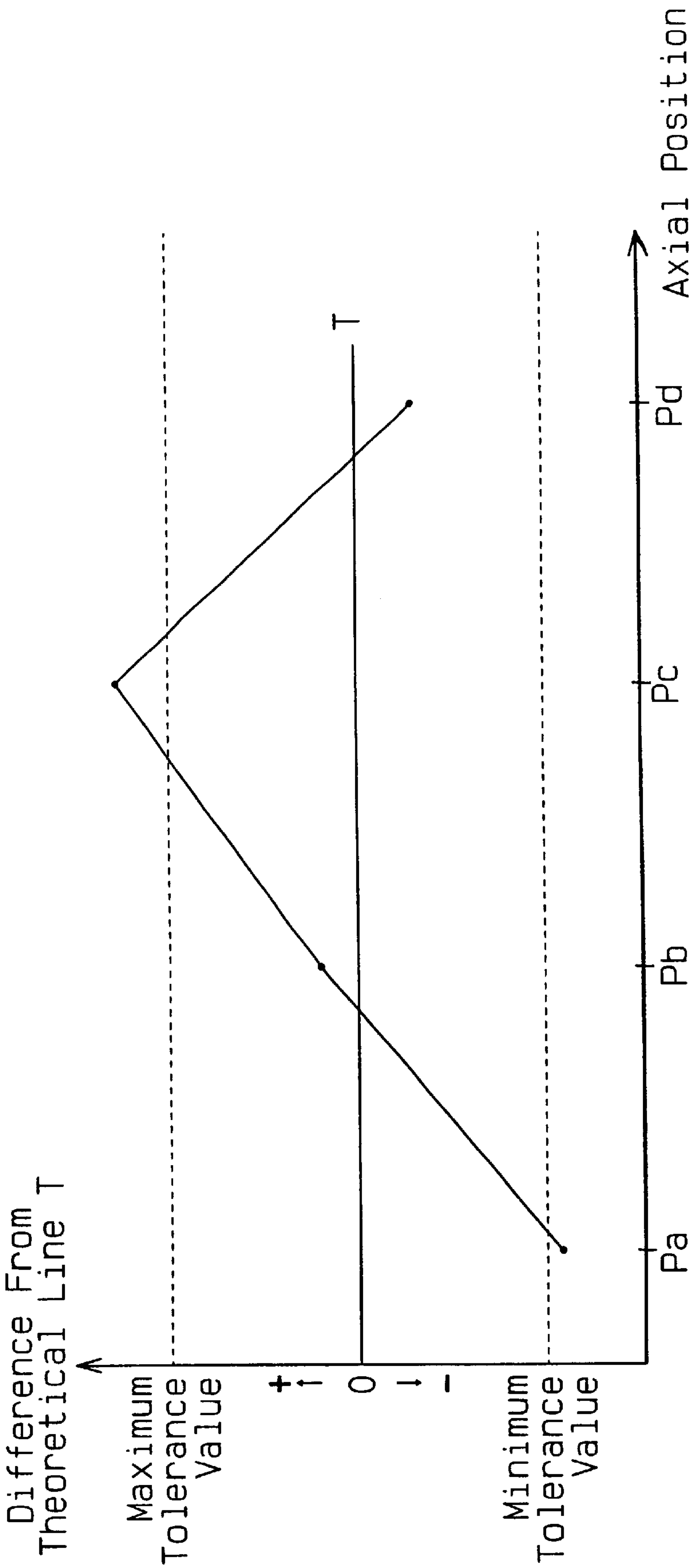
FIG. 18 is a graph showing an example of data taken by the measuring apparatus of FIG. 8 to inspect the intake valve cam.

If it is determined that any one of the cams 11 has a defective cam surface 11*a*, the control circuit 102 proceeds to step S230 and generates a message notifying of the existence of the defective cam 11. Examples of defective cams 11 will now be described with reference to the graphs of FIGS. 16 to 18. In FIG. 16, the distribution pattern of the measurement values taken at different axial positions Pa, Pb, Pc, Pd is inclined with respect to the theoretical line T. The measurement value taken at position Pa, which is located at one end of the cam surface 11*a*, is plotted at the positive side of and farthest from the theoretical line T. In FIG. 17, the distribution pattern of the measurement values taken at positions Pa, Pb, Pc, Pd shows that the middle portion of the cam surface 11*a* is recessed from the ends of the cam surface 11*a*. In FIG. 18, the distribution pattern of the measurement values taken at positions Pa, Pb, Pc, Pd shows that the middle portion of the cam surface 11*a* is projected from the ends of the cam surface 11*a*. However, the measurement values taken at positions Pa, Pc are outside the tolerance range.

When the measurement results are as shown in FIGS. 16 to 18, the control circuit 102 determines that the subject cam 11 is defective in steps S180, S190 and then proceeds to step S230 to announce the existence of the defective cam 11. For example, the word "defective" together with an inspection number may be displayed on the display device 114 or may be printed out by the printer 116. The control circuit 102 may also store the inspection result together with the inspection number in the external memory 112. Furthermore, data related to the inspection result may be transmitted to the host computer, which is connected to the control circuit 102.

The control circuit 102 terminates the inspection routine after performing either step S220 or step S230. After setting the next camshaft 10 in the measuring apparatus 100, the inspector pushes a switch, provided in the control circuit 102, to start measurements. This commences execution of the routines illustrated in FIGS. 12(*a*), 12(*b*), and 13. Thus, the cam profile of each cam 11 in the subject camshaft 10 is measured and inspected.

The following are advantages of the measuring apparatus.

The profile measuring tool 120 is provided with the contact element 122 and the holder 124. The measuring tool 120 includes the flat measuring surface 122*b* for contacting the cam surface 11*a*. The holder 124 supports the contact element 122 so that the contact element 122 is pivotal about its axis F. Thus, the contact element 122 pivots while following the cam surface 11*a*, which is inclined with respect to the axis of the cam 11. Furthermore, the measuring surface 122*b* includes the axis F. Thus, the measuring surface 122*b* remains in constant contact with the cam surface 11*a* and the axis F is never displaced despite the tilting of the contact element 122. Accordingly, the cam profile of the entire cam 11 is measured accurately.

The cam surface 11*a* is measured accurately especially when the cam surface 11*a* is convex. Therefore, the cam 11 is inspected accurately. This measurement method is effective when inspecting the cam 11 of the first embodiment. Accordingly, the measurement method guarantees that the three-dimensional cams 11 smoothly and accurately vary the opening and closing timing and lift amount of associated valves.

The profile measuring tool 120 moves along moving axis G, which is perpendicular to the contact axis F. In addition, the measuring surface 122*b* of the contact element 122 contacts the cam surface 11*a* with the axis F extending perpendicular to the axis A of the cam 11. The relationship between the cam 11 and the contact element 122 in terms of position is the same as the relationship between the cam 11 and the cam follower 25 of the valve lifter 191. Accordingly, the profile measurement of the cam 11 is conducted under the same conditions as when the cam 11 is actually employed in the engine 1. This enhances the reliability of the measurement and inspection results, which are obtained by simulating actual usage conditions.

The measurement of the height of the cam surface 11*a* is conducted in association with the rotary phase and axial position of the cam 11. Thus, the profile of the cam 11 is measured accurately.

When judging whether or not each cam 11 is satisfactory, the control circuit 102 determines whether the distribution pattern of the measurement values indicating the cam surface height is included within a tolerance range, which is based on the theoretical line T. The tolerance range does not affect the valve control structure. Thus, the same valve control structure used with the prior art cams 540 may be used with the cams 11. By using the cams 11, the shaft shifting mechanism 15 may be controlled in the same manner as in the prior art. Accordingly, the employment of three-dimensional cams 11 selected by the measuring apparatus 100 does not produce additional costs that would be required when changing the control system.

A third embodiment according to the present invention will now be described with reference to FIGS. 19(*a*), 19(*b*) and 20. This embodiment relates to an improved cam follower 25 of the valve lifters 191, 192 employed in the first embodiment. The cam follower 25 of this embodiment may be used with either the cam 11 of the first embodiment or the cam 540 of the prior art. In this embodiment, the cam follower 25 is applied to a valve drive apparatus employing intake valve cams 311, which are identical to the prior art cams 540. The structure of the third embodiment differs from the first embodiment only in the cam follower 25 and the intake valve cam 311. Thus, parts that are like or identical to corresponding parts in the first embodiment are denoted with the same reference numerals.

Figure 19A:
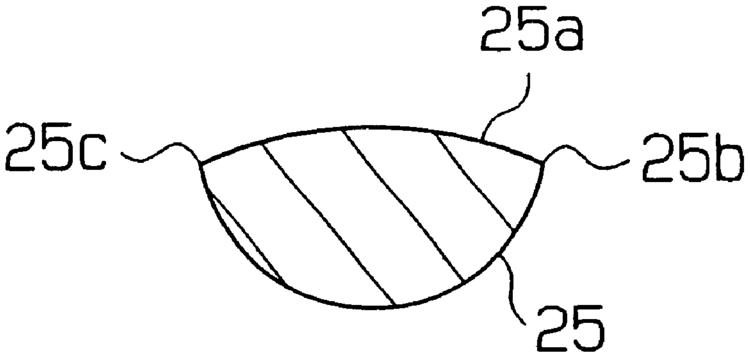
FIG. 19(*a*) is a cross-sectional view showing a cam follower employed in a third embodiment according to the present invention, and FIG. 19(*b*) is a side view showing the cam follower.
Figure 19B:
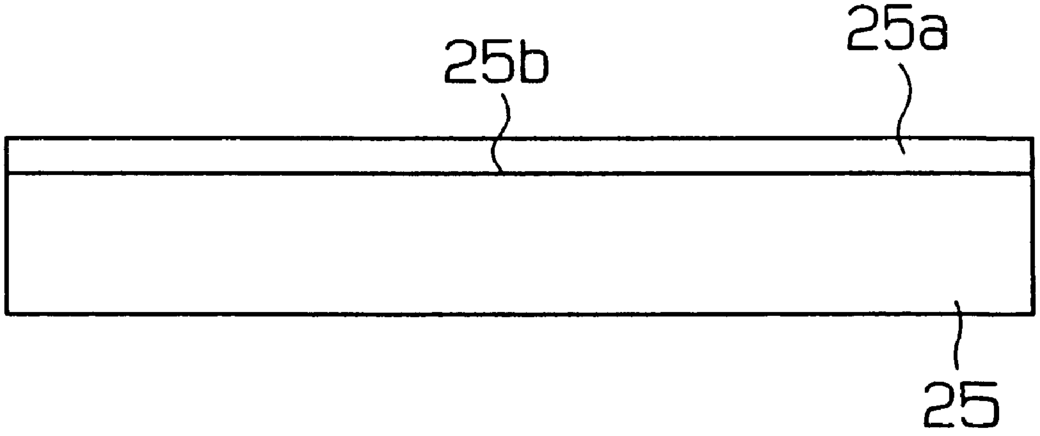

As shown in FIGS. 19(*a*) and 19(*b*), the slide surface 25*a* of each cam follower 25 is convex so that the middle portion is projected in comparison to the long edges. The slide surface 25*a* has a radius of curvature that is 50 to 300 times greater than the width of the cam follower 25, where the width is measured in the horizontal direction of FIG. 19(*a*).

Figure 20A:
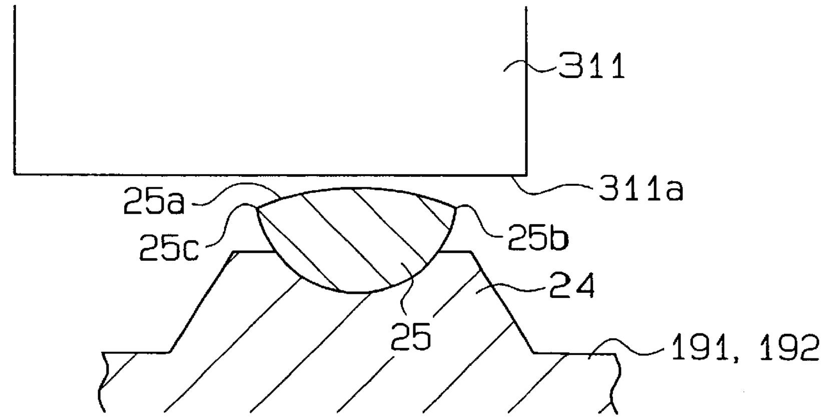
FIGS. 20(*a*), 20(*b*), 20(*c*) are partially enlarged cross-sectional views showing the relationship between the cam follower of FIG. 19(*a*) and the cam surface.
Figure 20B:
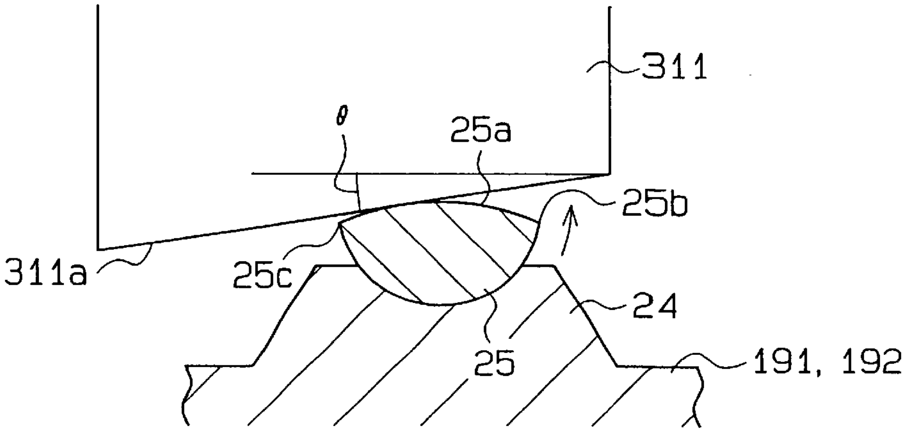
Figure 20C:
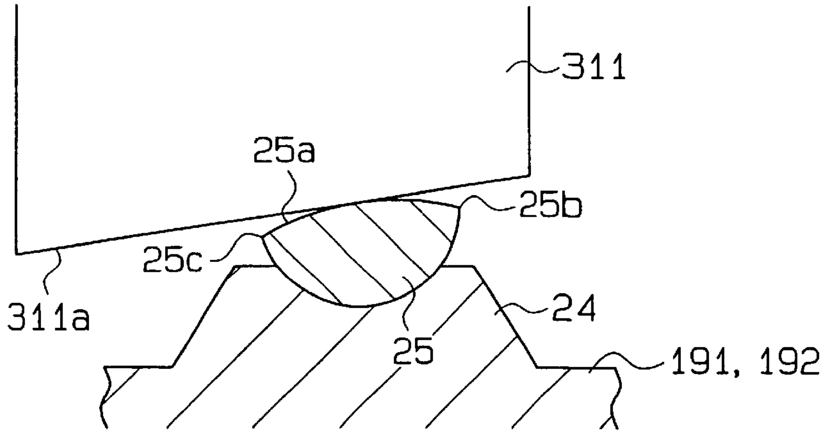

As shown in FIGS. 20(*a*), the portion of the cam surface 311 corresponding to the base circle is parallel to the axis of the cam 311, or cylindrical. The portion of the cam surface 311 corresponding to the cam nose is inclined with respect to the axis of the cam 311, as shown in FIG. 20(*b*). Thus, during rotation of the cam 311, the cam follower 25 is pivoted in its seat 24 in accordance with the inclination of the cam surface 311*a*.

As shown in FIG. 20(*a*), a slight clearance exists between the cam surface 311*a* and the slide surface 25*a* of the cam follower 25 when the cam follower 25 faces the portion of the cam surface 311*a* corresponding to the base circle of the cam 311. The clearance is provided to prevent the portion of the cam surface 311*a* corresponding to the base circle of the cam 311 from opening the associate valve 18 when the cam 311, the associated valve lifter 191, 192, and the associated valve thermally expand.

The cam 311 rotates from the state shown in FIG. 20(*a*) to the state shown in FIG. 20(*b*). When the portion of the cam surface 311*a* corresponding to the cam nose faces the cam follower 25, the cam surface 311*a* comes into contact with the slide surface 25*a*. If the slide surface 25*a* is flat, the edge 25*c* of the cam follower 25 would first come into contact with the cam surface 311*a*, this may damage the cam surface 311*a*. However, in this embodiment, the slide surface 311*a* is convex. Thus, damage to the cam surface 311*a* is prevented since the edge 25*c* does not contact the cam surface 311*a*.

Furthermore, the convexly arched slide surface 25*a* is in contact with the cam surface 311*a*, as shown in FIGS. 20(*b*) and 20(*c*). This reduces the force and impact applied to the cam surface 311*a* when the slide surface 25*a* comes into contact with the cam surface 311*a* in comparison to when the edge 25*c* comes into contact with the slide surface 25*a*. As a result, damage to and wear of the cam surface 311*a* is prevented.

As shown in FIG. 20(*b*), the cam follower 311*a* pivots in the direction of the arrow when contacting the cam surface 311*a*. This faces the slide surface 25*a* of the cam follower 25 toward the cam surface 311*a*. In this state, the middle portion of the slide surface 25*a* contacts the cam surface 311*a* and the edges 25*b*, 25*c* of the cam follower 25 do not contact the cam surface 311*a*.

Accordingly, the same advantages obtained in the first embodiment are obtained in this embodiment by providing the convex slide surface 25*a*. More specifically, satisfactory lubrication is maintained between the cam surface 311*a* and the cam follower 25 in the same manner as in the first embodiment. Thus, damage to and wear of the cam surface 311*a* and the cam follower 25 are reduced or eliminated. This maintains smooth relative movement between the cam surface 311*a* and the cam follower 25. Furthermore, the cam surface 311*a* is prevented from becoming uneven due to wear and is prevented from becoming scratched. Therefore, the cam follower 25 is not interfered with by an uneven surface or scratches when the cam 311 moves axially. Accordingly, the open and closing timing and valve lift amount of the intake valves 18 are varied smoothly.

Figure 21:
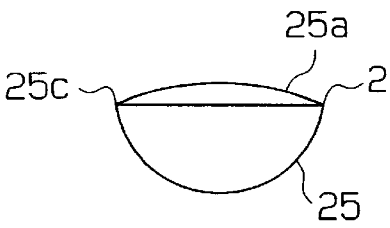
FIG. 21(*a*) is an end view showing a cam follower employed in a fourth embodiment according to the present invention, and FIG. 21(*b*) is a side view showing the cam follower of FIG. 21(*a*)
Figure 21:
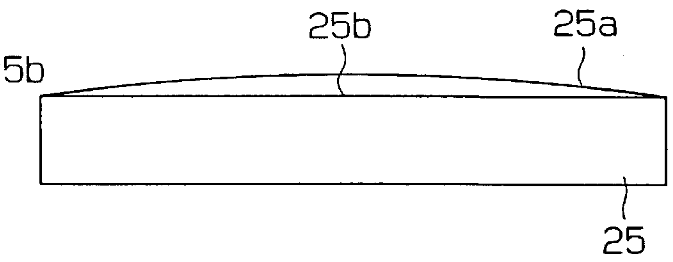

A fourth embodiment according to the present invention will now be described with reference to FIGS. 21(*a*) and 21(*b*). In this embodiment, the cam follower 25 of the third embodiment is modified. The cam follower 25 has a slide surface 25*a* that is convexly arched not only in the axial direction of the cam, but also in a direction perpendicular to the axis of the cam.

Figure 22:
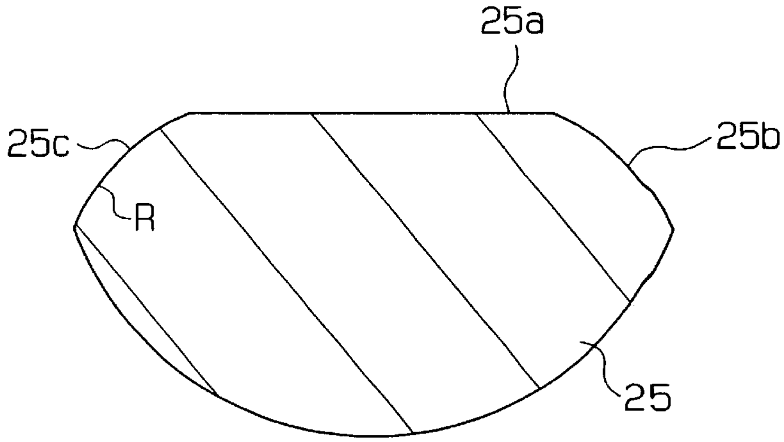
FIG. 22 is a cross-sectional view showing a cam follower employed in a fifth embodiment according to the present invention.

A fifth embodiment according to the present invention will now be described with reference to FIG. 22. The cam follower 25 of the third embodiment is modified in this embodiment. The cam follower 25 has a slide surface 25*a* provided with a flat middle portion and rounded edges 25*b*, 25*c*. In other words, only the edges of the slide surface 25*a* are curved. The radii of curvature R of the edges 25*b*, 25*c* are equal to each other.

Figure 23:
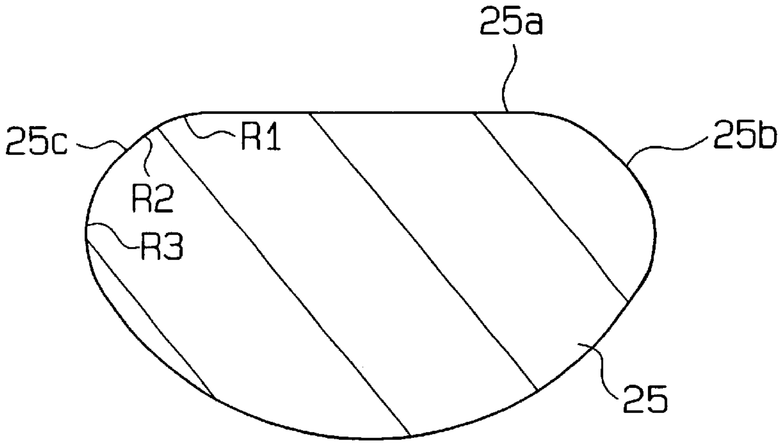
FIG. 23 is a cross-sectional view showing a cam follower employed in a sixth embodiment according to the present invention.
Figure 24:
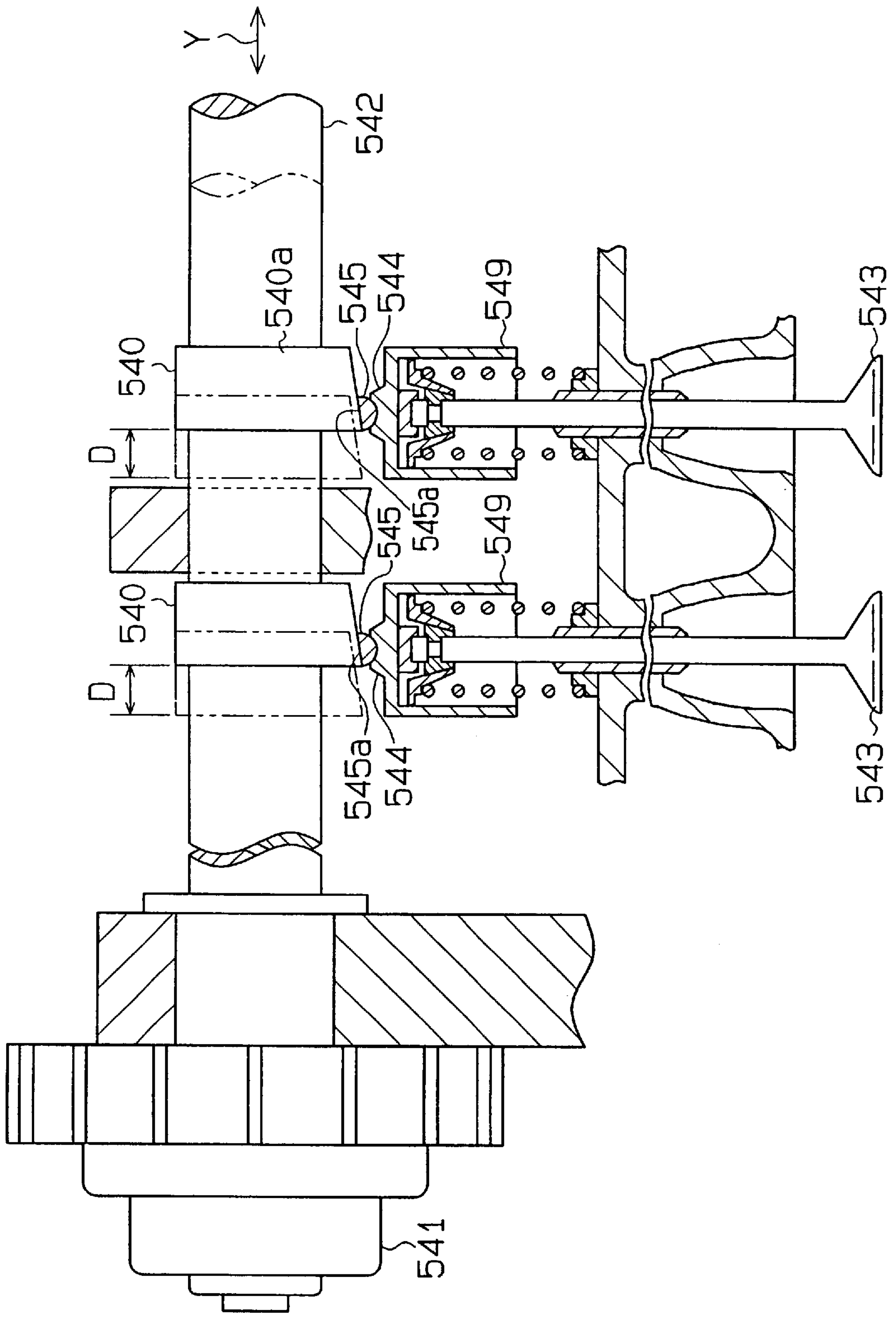
Fig.24 (Prior Art)
FIG. 24 is a cross-sectional view showing a prior art valve drive apparatus.
Figure 25A:
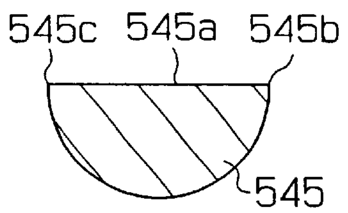
Fig.25(a) (Prior Art)
FIG. 25(*a*) is a cross-sectional view showing a cam follower of the valve drive apparatus of FIG. 24, and FIG. 25(*b*) is a side view of the cam follower of FIG. 25(*a*)
Figure 25B:
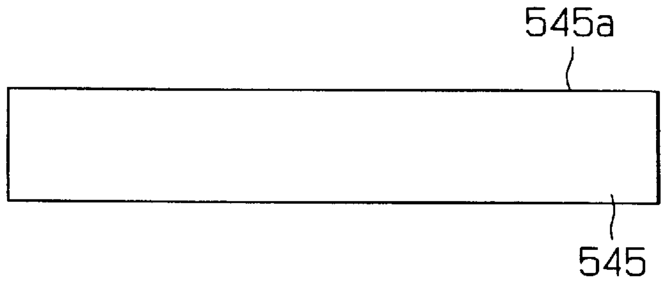
Fig.25(b) (Prior Art)
Figure 26:
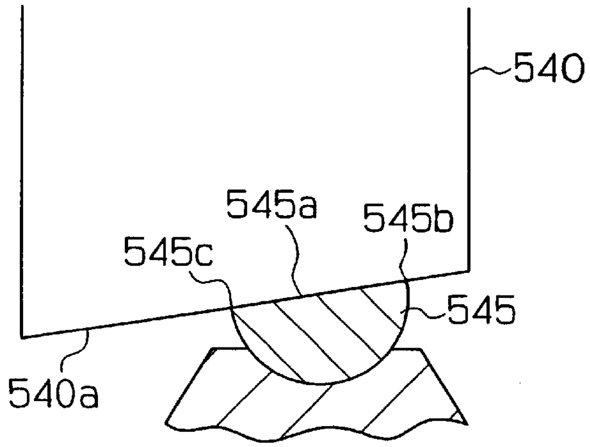
Fig.26 (Prior Art)
FIG. 26 is a partially enlarged cross-sectional view showing a state of contact between the cam follower of FIG. 25(*a*) and the cam surface.

A sixth embodiment according to the present invention will now be described with reference to FIG. 23. The cam follower 25 of this embodiment differs from that of the embodiment shown in FIG. 22 in that each edge 25*b*, 25*c* is rounded to define a curved surface having three radii of curvatures R1, R2, R3. In other words, each edge 25*b*, 25*c* includes three portions, each portion having a different radius of curvature R1, R2, R3. In the cam follower 25 of FIG. 22, a ridge line exists between the slide surface 25*a* and the curved surface. However, a ridge line does not exist in the cam follower 25 of FIG. 23. This guarantees the prevention of damages to the cam surface of the associated cam.

It should be apparent to those skilled in the art that the present invention may be embodied in many other specific forms without departing from the spirit or scope of the invention. More particularly, the present invention may also be embodied as described below.

If the shaft shifting mechanism 15 shown in FIG. 2 is provided for the exhaust valve camshaft 12 in addition to or in lieu of that of the intake valve camshaft 10, the present invention may be applied to cams 13 of the camshaft 12 and the cam followers of the associated valve lifters 21.

The measuring apparatus 100 may be used not only to measure the three-dimensional cam 11 shown in FIG. 1 but also to measure other types of cams. For example, the measuring apparatus 100 may be used to measure a normal cam having a cam surface parallel to the cam axis. Although a slight change may become necessary in the control program, the mechanical structure of the measuring apparatus 100 need not be changed to accommodate different types of cams.

In the valve drive apparatus shown in FIG. 6, the intake valve cams 11 are provided integrally with the camshaft 10 and the shaft shifting mechanism 15 axially moves the camshaft 10 together with the cams 11. However, the camshaft 10 and the cams 11 may be constructed so that the camshaft 10 remains in a fixed position while only the cams 11 move axially.

The engine 1 shown in FIG. 2 has four valves for each cylinder. However, the present invention may be applied to an engine that employs more than or less than four valves for each cylinder.

In the valve drive apparatus shown in FIG. 2, each valve 11 drives a corresponding valve lifter 191, 192. However, the present invention may be employed in a valve drive apparatus that drives two valve lifters with a single cam 11.

The measuring apparatus 100 shown in FIG. 8 measures the axial position and rotary phase of the camshaft 10 and associates the measured values with the height of the cam surface 11*a*. However, the measuring apparatus 100 may be eliminated if the rotary drive device 104 and the linear drive device 106 are driven with high precision. In this case, the command values sent from the control circuit 102 to drive the rotary drive device 104 and the linear drive device 106 are associated with the height of the cam surface 11*a*. Such structure also allows accurate measurement of the cam surface.

The profile measuring tool 120 shown in FIG. 9 pivotally supports the contact element 122 with the holder 124. However, the contact element 122 need not be pivotally supported by the holder 124. For example, the structure supporting the contact element 122 may be replaced by a structure similar to that of the structure supporting the cam follower seat 24 with the associated valve lifter 191, 192. In other words, the holder 124 may have concave recesses similar to that of the cam follower seat 24 to pivotally receive the contact element 122.

When measuring the height of the cam surface 11*a* with the measuring apparatus 100 of FIG. 8, the height of the cam surface 11*a* need not be measured directly. A physical quantity corresponding to the height of the cam surface 11*a* may be measured instead. For example, a predetermined reference point may be defined on the surface of the cam 11 so that the distance from the reference point to the cam surface 11*a* is used as the physical quantity corresponding to the height of the cam surface 11*a*. As another option, a contact sensor or a non-contact sensor may be attached to the surface of the cam 11. In this case, the output signal (e.g., voltage) sent from the sensor is used as the physical quantity corresponding to the height of the cam surface 11*a*.

Therefore, the present examples and embodiments are to be considered as illustrative and not restrictive and the invention is not to be limited to the details given herein, but may be modified within the scope and equivalence of the appended claims.

What is claimed is:

1. A cam that rotates about its axis and a measuring tool used to measure the profile of a cam surface defined on the cam, wherein the measuring tool comprises:

a contact element having a planar measuring surface for contacting the cam surface; and a holder for supporting the contact element pivotally about a pivot axis extending perpendicular to the cam axis, wherein the measuring surface lies along the pivot axis and has a portion that constantly contacts the cam surface, wherein the holder moves along a moving axis perpendicular to the pivot axis during rotation of the cam, and wherein the position of the holder on the moving axis indicates the radius of the cam surface at a location where the measuring surface contacts the cam surface.

2. A cam that rotates about its axis and an apparatus for measuring the profile of a cam surface defined on the cam, wherein the measuring apparatus comprises:

a measuring tool faced toward the cam surface, the measuring tool including a contact element having a planar measuring surface slidably engaged with the cam surface and a holder for supporting the contact element pivotally about a pivot axis, which extends perpendicular to the cam axis, wherein the measuring surface lies along the pivot axis and has a portion that constantly contacts the cam surface, wherein the measuring tool moves along a moving axis during rotation of the cam, and wherein the position of the measuring tool along the moving axis indicates the radius of the cam surface at a location where the measuring surface contacts the cam surface;

a rotary drive means for rotating the cam about its axis to angularly vary the part of the cam surface that the measuring surface contacts;

a moving means for moving the cam axially to axially vary the part of the cam surface that the measuring surface contacts; and a measuring means for measuring the position of the measuring tool along its moving axis in association with the angular and axial positions of the part of the cam surface that the measuring surface contacts.

3. The measuring apparatus of claim 2 further comprising an inspection means for inspecting the cam, wherein the inspection means plots distribution patterns, each distribution pattern being based on measurement values taken along the cam surface at the same angular position but at different axial positions, and wherein the inspecting means judges whether each distribution pattern represents a convex cam surface within a predetermined tolerance range to confirm that the cam is satisfactory.

4. The measuring apparatus of claim 3, wherein the tolerance range is based on a straight line pattern representing a reference cam surface radius at the angular cam position corresponding to each distribution pattern.

5. A method for measuring the profile of a cam surface defined on a cam that rotates about its axis, wherein the measuring method comprises the steps of:

facing a measuring tool toward the cam surface, the measuring tool including a contact element having a planar measuring surface slidably engaged with the cam surface and a holder for supporting the contact element pivotally about a pivot axis extending perpendicular to the cam axis, wherein the measuring surface lies along the pivot axis and has a portion that constantly contacts the cam surface, wherein the measuring tool moves along a moving axis during rotation of the cam, and wherein the position of the measuring tool along the moving axis indicates the radius of the cam surface at a location where the measuring surface contacts the cam surface;

rotating the cam about its axis to angularly vary the part of the cam surface that the measuring surface contacts;

moving the cam axially to axially vary the part of the cam surface that the measuring surface contacts; and measuring the position of the measuring tool along its moving axis in association with the angular and axial positions of the part of the cam surface that the measuring surface contacts.

6. The measuring method according to claim 5 further comprising the step of inspecting the cam by plotting distribution patterns, each distribution pattern being based on measurement values taken along the cam surface at the same angular position but at different axial positions, the inspection being performed by judging whether each distribution pattern represents a convex cam surface within a predetermined tolerance range to confirm that the cam is satisfactory.

7. The measuring method according to claim 6, wherein the tolerance range is based on a straight line pattern representing a reference cam surface radius at the angular cam position corresponding to each distribution pattern.

8. A method for measuring the profile of a cam surface defined on a cam that rotates about its axis, the cam surface having a profile that varies continuously in the direction of the cam axis, the cam surface being convexly arched in the direction of the cam axis, wherein the measuring method comprises the steps of:

measuring a physical quantity representing the cam surface radius in association with the angular position and axial position of a measured location on the cam surface; and inspecting the cam by plotting distribution patterns, each distribution pattern being based on measurement values taken along the cam surface at the same angular position but at different axial positions, the inspection being performed by judging whether each distribution pattern represents a convex cam surface within a predetermined tolerance range to confirm that the cam is satisfactory.

9. The measuring method according to claim 8, wherein the tolerance range is based on a straight line pattern representing a reference cam surface radius at the angular position corresponding to each distribution pattern.

* * * * *